US012794702B2

(12) United States Patent
Doshi et al.

(10) Patent No.: US 12,794,702 B2
(45) Date of Patent: Nov. 10, 2026

(54) ROOTS OF TRUST IN INTELLECTUAL PROPERTY (IP) BLOCKS IN A SYSTEM ON A CHIP (SOC)

(71) Applicant: INTEL PRODUCTS IP LLC, Santa Clara, CA (US)

(72) Inventors: Kshitij Doshi, Tempe, AZ (US); Ned M. Smith, Beaverton, OR (US); Rajesh Poornachandran, Portland, OR (US); Sunil K. Cheruvu, Tempe, AZ (US); David W. Palmer, Beaverton, OR (US)

(73) Assignee: INTEL PRODUCTS IP LLC, Santa Clara, CA (US)

( * ) Notice: Subject to any disclaimer, the term of this patent is extended or adjusted under 35 U.S.C. 154(b) by 287 days.

(21) Appl. No.: 18/064,546

(22) Filed: Dec. 12, 2022

(65) Prior Publication Data

US 2024/0195635 A1 Jun. 13, 2024

(51) Int. Cl.
*H04L 9/32* (2006.01)
*H04L 9/08* (2006.01)

(52) U.S. Cl.
CPC .......... *H04L 9/3247* (2013.01); *H04L 9/0825* (2013.01); *H04L 9/0869* (2013.01)

(58) Field of Classification Search
None
See application file for complete search history.

(56) References Cited

U.S. PATENT DOCUMENTS 7,073,073 B1 * 7/2006 Nonaka ................. H04L 9/3247 380/278
7,761,465 B1 * 7/2010 Nonaka .................. G10K 15/02 713/161
8,417,965 B1 * 4/2013 Sundararajan ...... G06F 11/3664 713/150
8,812,828 B2 8/2014 Datta et al.
8,856,524 B2 * 10/2014 Camenisch ........... H04L 9/3247 713/168
8,874,916 B2 10/2014 Smith et al.
9,386,037 B1 * 7/2016 Hunt .................. H04L 63/1433

(Continued)

OTHER PUBLICATIONS

Perez "Silicon Systems Security and Building a Root of Trust," IEEE Asian Solid-State Circuits Conference, IEEE, pp. 1-4 (Year: 2015).*

(Continued)

*Primary Examiner* — Luu T Pham
*Assistant Examiner* — James J Wilcox
(74) *Attorney, Agent, or Firm* — Nicholson De Vos Webster & Elliott LLP

(57) ABSTRACT

The technology described herein includes a plurality of intellectual property (IP) blocks; and a host IP block, the host IP block including a primary root of trust (RoT) IP block (PRIB) coupled to the plurality of IP blocks, to receive a request from a computing system to establish a secure communications session with a selected one of a plurality of intellectual property (IP) blocks, authenticate and attest the computing system, sign evidence of the PRIB with a PRIB key, send the signed evidence of the PRIB to the computing system, and establish the secure communications session between the computing system and the selected IP block if the PRIB is trusted by the computing system based at least in part on the signed evidence of the PRIB.

22 Claims, 14 Drawing Sheets

(56) References Cited

U.S. PATENT DOCUMENTS 9,559,849 B1 * 1/2017 Wasiq ................... H04L 63/123
9,626,512 B1 * 4/2017 Brandwine ......... G06F 9/45533
9,667,414 B1 * 5/2017 Brandwine ........... H04L 9/0819
9,678,895 B2 6/2017 Scott-Nash
9,680,872 B1 * 6/2017 Roth ....................... G06F 21/44
9,697,371 B1 * 7/2017 Willden .................. G06F 21/62
9,832,022 B1 * 11/2017 Pedersen ............... H04L 9/3247
9,967,092 B2 * 5/2018 Henry ..................... G06F 21/54
9,967,238 B1 * 5/2018 Hogan .................. H04L 9/3247
10,028,010 B2 7/2018 Pendakur et al.
10,211,985 B1 * 2/2019 Brandwine ........... H04L 9/3239
10,402,567 B2 * 9/2019 Jung ..................... H04L 9/3247
10,438,437 B1 * 10/2019 Herrington ........ G06Q 20/3278
10,503,892 B2 * 12/2019 Domke ................... G06F 21/57
10,511,436 B1 * 12/2019 Machani ................. H04L 9/085
10,521,618 B1 * 12/2019 Zhang ................... H04L 9/0643
10,535,062 B1 * 1/2020 Rule .................. G06Q 20/4014
10,601,589 B1 * 3/2020 Prokopenya .......... H04L 9/3247
10,664,941 B1 * 5/2020 Osborn ................. H04L 9/3247
10,764,294 B1 * 9/2020 Wasiq ..................... H04L 63/10
10,789,179 B1 * 9/2020 Todd ..................... H04L 9/0637
10,795,755 B2 * 10/2020 Nale ...................... G11C 7/222
10,826,875 B1 * 11/2020 Kim .................... H04L 63/0428
10,904,012 B1 * 1/2021 Duncan ................. H04L 9/3247
11,050,562 B2 * 6/2021 Chen ..................... H04L 9/3242
11,080,403 B1 * 8/2021 Taylor ................... G06F 21/566
11,164,179 B2 * 11/2021 Greiche .................. H04L 63/08
11,232,219 B1 * 1/2022 Ochotta ................ G06F 21/121
11,373,179 B2 * 6/2022 Higgins ................ H04L 9/3247
11,405,189 B1 * 8/2022 Bennison ............ H04L 63/0807
11,507,562 B1 * 11/2022 Luedtke .................... H04L 9/50
11,556,327 B2 1/2023 Kotary et al.
11,573,830 B2 * 2/2023 Bartfai-Walcott ...... H04L 9/321
11,579,897 B2 * 2/2023 Bartfai-Walcott .......................... G06F 11/3058
11,580,570 B2 2/2023 Pendakur et al.
11,677,557 B1 * 6/2023 Tree ...................... H04L 9/3271 713/168
11,689,373 B2 * 6/2023 Hawkins ............... H04L 9/3247 713/176
11,709,941 B1 * 7/2023 Cohen ................... G06F 21/575
11,860,858 B1 * 1/2024 McKervey ............ H04L 9/3297
11,902,433 B1 * 2/2024 Wu ....................... H04L 9/3247
12,158,977 B1 * 12/2024 Ramakrishnan ...... G06F 21/572
12,335,409 B2 * 6/2025 Okuda .................. H04L 9/0825
12,368,606 B1 * 7/2025 Liu ....................... H04L 9/3242
12,541,247 B1 * 2/2026 Buys ....................... G06F 3/011
12,578,806 B1 * 3/2026 Kemp ..................... G06F 3/023
12,650,849 B2 * 6/2026 Montero ............... G06F 9/4403
12,650,909 B2 * 6/2026 Sayyed ................... G06F 11/27
12,652,191 B2 * 6/2026 Hamlin ................... H04L 12/42
2003/0046238 A1 * 3/2003 Nonaka ................... H04L 9/083 380/282
2004/0006543 A1 * 1/2004 Twining ............... G06Q 50/188 705/80
2004/0078571 A1 * 4/2004 Haverinen ............ H04L 9/3213 713/168
2006/0136725 A1 * 6/2006 Walmsley ............. H04L 9/3247 713/171
2006/0294312 A1 * 12/2006 Walmsley ............. H04L 9/3215 711/122
2007/0094719 A1 * 4/2007 Scarlata ................ G06F 21/577 726/9
2007/0101144 A1 * 5/2007 Owen ................. H04L 65/1069 713/176
2007/0118750 A1 * 5/2007 Owen ................... H04L 9/3247 713/176
2008/0126779 A1 5/2008 Smith
2009/0106557 A1 * 4/2009 Leonard .................. H04L 63/12 713/176
2009/0313682 A1 * 12/2009 Rajput .................. H04L 63/102 726/4
2009/0327741 A1 12/2009 Zimmer et al.
2010/0122088 A1 * 5/2010 Oxford ................. H04L 9/3236 380/278
2011/0010543 A1 * 1/2011 Schmidt ................ H04W 12/06 713/168
2011/0173452 A1 * 7/2011 Nan ...................... H04L 9/3073 380/279
2012/0233677 A1 * 9/2012 Kowalewski ......... H04W 12/12 726/7
2013/0287204 A1 * 10/2013 Davis .................... H04L 9/3236 380/28
2013/0290700 A1 * 10/2013 Davis ..................... G06Q 10/10 713/153
2014/0007222 A1 * 1/2014 Qureshi .................. H04L 67/10 726/16
2014/0016776 A1 * 1/2014 Van Foreest ............ G06F 21/73 380/46
2014/0044265 A1 * 2/2014 Kocher ............... H04L 63/0823 380/277
2014/0108784 A1 * 4/2014 Pendarakis ........... H04L 9/3263 713/175
2014/0188964 A1 * 7/2014 Weaver, Jr. ............. G06F 21/72 708/250
2014/0281531 A1 * 9/2014 Phegade ............. G06F 9/45558 713/168
2014/0289808 A1 * 9/2014 Blanke .................... H04L 63/08 726/4
2014/0317413 A1 * 10/2014 Deutsch ................ H04L 63/145 713/176
2014/0340112 A1 * 11/2014 Tehranipoor .......... H04L 9/0869 326/8
2015/0078665 A1 * 3/2015 Wang .................... G06F 21/645 382/187
2015/0222517 A1 * 8/2015 McLaughlin ........... H04W 4/70 713/171
2015/0234751 A1 * 8/2015 Van Der Sluis .... G06F 12/1408 713/193
2015/0256332 A1 * 9/2015 Raj ......................... G06F 21/78 713/150
2015/0281189 A1 * 10/2015 Nayshtut ............... H04L 63/045 713/168
2015/0319160 A1 * 11/2015 Ferguson ................ H04L 63/12 726/10
2015/0381575 A1 * 12/2015 Bhargav-Spantzel ....................... H04L 63/061 713/168
2016/0065376 A1 * 3/2016 Smith ................. H04L 63/0435 713/171
2016/0094340 A1 * 3/2016 Wolrich ................ G06F 9/3887 713/189
2016/0099811 A1 * 4/2016 Hawblitzel ........... H04L 9/3268 713/176
2016/0125180 A1 * 5/2016 Smith ................... H04L 9/0822 726/20
2016/0210578 A1 * 7/2016 Raleigh ............. H04W 28/0215
2016/0337329 A1 * 11/2016 Sood ....................... G06F 21/10
2017/0039352 A1 * 2/2017 Volkening ............... G06F 21/57
2017/0090872 A1 * 3/2017 Mathew ................ H04L 9/0869
2017/0180392 A1 * 6/2017 Huth ..................... H04L 9/3278
2017/0201385 A1 * 7/2017 Kravitz ................... H04L 9/006
2017/0244565 A1 * 8/2017 Bronk ................. H04W 12/106
2017/0244568 A1 * 8/2017 Brickell .............. H04W 12/041
2017/0286544 A1 * 10/2017 Hunt ..................... H04L 63/123
2017/0289197 A1 * 10/2017 Mandyam ................. H04L 9/32
2017/0366347 A1 * 12/2017 Smith ................... H04L 9/3247
2018/0004930 A1 * 1/2018 Csinger ............... H04L 63/0853
2018/0027686 A1 * 1/2018 Adiletta .................. H04L 67/02
2018/0034629 A1 * 2/2018 Cheng ................... H04L 9/0869
2018/0145836 A1 * 5/2018 Saur ................... G06Q 20/3829
2018/0152307 A1 * 5/2018 Grover .................. H04L 9/3247
2018/0157558 A1 * 6/2018 Karame .................. G06F 11/07
2018/0167203 A1 * 6/2018 Belenko ..................... H04L 9/14
2018/0176077 A1 * 6/2018 Kanakarajan ......... H04L 9/3247
2018/0183586 A1 * 6/2018 Bhargav-Spantzel ....................... G06F 21/32
2018/0191501 A1 * 7/2018 Lindemann ........... H04L 9/0833
2018/0204286 A1 * 7/2018 Hassett ................. H04L 9/0825
2018/0212932 A1 * 7/2018 Novak ................ H04L 63/0428

(56) References Cited

U.S. PATENT DOCUMENTS

2018/0212940 A1* 7/2018 Novak ................ H04L 9/3263
2018/0287802 A1* 10/2018 Brickell ................ H04L 9/006
2018/0294969 A1* 10/2018 Holness ................ H04L 9/3247
2018/0309567 A1* 10/2018 Wooden ................ H04L 63/12
2018/0309583 A1* 10/2018 Bate ................ H04L 9/3247
2018/0323977 A1* 11/2018 Hojsik ................ H04L 67/12
2018/0359264 A1* 12/2018 Sweet ................ H04L 63/1408
2018/0365069 A1* 12/2018 Nemiroff ................ H04L 9/0822
2019/0004973 A1* 1/2019 Chhabra ................ G06F 12/1408
2019/0007200 A1* 1/2019 Shah ................ H04L 9/3247
2019/0007212 A1* 1/2019 Neve De Mevergnies ................ H04L 9/3226
2019/0020647 A1* 1/2019 Sinha ................ H04L 63/061
2019/0026477 A1 1/2019 Smith et al.
2019/0042711 A1* 2/2019 Parhi ................ H04L 9/0825
2019/0044708 A1* 2/2019 Dewan ................ H04L 9/0897
2019/0044710 A1* 2/2019 Zhang ................ H04L 9/0631
2019/0044724 A1* 2/2019 Sood ................ H04L 9/0825
2019/0044737 A1* 2/2019 Singhi ................ H04L 9/0825
2019/0044740 A1* 2/2019 Smith ................ H04W 12/009
2019/0057115 A1* 2/2019 Liu ................ H04L 9/3247
2019/0103961 A1* 4/2019 Chhabra ................ H04L 9/0838
2019/0109877 A1* 4/2019 Samuel ................ H04W 4/70
2019/0116038 A1* 4/2019 Sprague ................ H04L 9/3226
2019/0138294 A1* 5/2019 Smith ................ H04L 9/0894
2019/0140828 A1* 5/2019 Wheeler ................ H04L 9/3242
2019/0140836 A1* 5/2019 Novak ................ G06F 21/74
2019/0140846 A1* 5/2019 Moore ................ H04L 9/0825
2019/0141045 A1* 5/2019 Stöcker ................ G06F 16/1834
2019/0149333 A1* 5/2019 Harnik ................ H04L 9/3247 713/176
2019/0164156 A1* 5/2019 Lindemann ................ H04L 63/0861
2019/0165935 A1* 5/2019 Tehranipoor ................ H04L 9/14
2019/0182053 A1* 6/2019 Varpiola ................ H04L 9/3247
2019/0188712 A1* 6/2019 Fedorov ................ G06F 21/53
2019/0236271 A1* 8/2019 Shivanna ................ H04L 9/0863
2019/0238456 A1* 8/2019 Wang ................ H04L 9/0891
2019/0238498 A1* 8/2019 Cleary ................ H04L 63/08
2019/0243963 A1* 8/2019 Soriente ................ H04L 9/3247
2019/0287105 A1* 9/2019 Fedorov ................ G06Q 20/401
2019/0305973 A1* 10/2019 Dewan ................ H04L 9/14
2019/0319964 A1* 10/2019 Smith ................ H04L 69/22
2019/0332773 A1* 10/2019 Konetski ................ H04L 63/126
2019/0334859 A1* 10/2019 Kannan ................ H04L 61/5061
2019/0349426 A1* 11/2019 Smith ................ H04L 9/3239
2019/0386829 A1* 12/2019 Karame ................ G06F 11/1451
2019/0394096 A1* 12/2019 Bernat ................ G06F 9/4856
2020/0019734 A1* 1/2020 Raja Gopal ................ H04L 9/0631
2020/0021445 A1* 1/2020 Caceres ................ G06F 21/44
2020/0045023 A1* 2/2020 Yu ................ H04L 9/3247
2020/0074464 A1* 3/2020 Trevethan ................ G06Q 20/3829
2020/0082091 A1* 3/2020 Areno ................ G06F 9/45558
2020/0097648 A1* 3/2020 Soriente ................ H04L 63/0421
2020/0125770 A1* 4/2020 LeMay ................ H04L 9/32
2020/0127850 A1* 4/2020 Scarlata ................ H04L 9/3242
2020/0127980 A1* 4/2020 Smith ................ G06F 9/5077
2020/0128022 A1* 4/2020 Bleikertz ................ H04L 63/0428
2020/0136906 A1* 4/2020 Guim Bernat ................ G06F 9/5094
2020/0145419 A1* 5/2020 Yitbarek ................ H04L 63/0853
2020/0153623 A1* 5/2020 Asanghanwa ................ H04L 9/3213
2020/0153629 A1* 5/2020 Yitbarek ................ H04L 9/0897
2020/0162239 A1* 5/2020 Carver ................ G06F 16/2365
2020/0167341 A1* 5/2020 Carver ................ H04L 9/3073
2020/0169388 A1* 5/2020 Wei ................ G06Q 20/02
2020/0169395 A1* 5/2020 Hong ................ H04L 9/14
2020/0175183 A1* 6/2020 Ramasamy ................ G06F 21/30
2020/0177604 A1* 6/2020 Wei ................ H04L 9/3234
2020/0186568 A1* 6/2020 Erb ................ H04L 9/0841
2020/0193065 A1* 6/2020 Smith ................ G06F 21/73
2020/0195448 A1* 6/2020 Yang ................ H04L 9/0643
2020/0202041 A1* 6/2020 Li ................ H04L 9/3247
2020/0204587 A1* 6/2020 Hunt ................ G06F 21/128
2020/0210314 A1* 7/2020 Wang ................ H04L 9/0637
2020/0280446 A1* 9/2020 Matsumoto ................ H04L 9/3234
2020/0287880 A1* 9/2020 Getsin ................ H04L 9/0894
2020/0293635 A1* 9/2020 Martin ................ H04L 9/3073
2020/0293636 A1* 9/2020 Martin ................ G06F 21/1011
2020/0311299 A1* 10/2020 Amar ................ H04L 9/3239
2020/0313902 A1* 10/2020 Yu ................ G06F 21/6218
2020/0313903 A1* 10/2020 Yu ................ H04L 9/3073
2020/0320199 A1* 10/2020 Sheth ................ H04L 63/123
2020/0322134 A1* 10/2020 Duval ................ G06F 21/44
2020/0322145 A1* 10/2020 Sheth ................ H04L 9/3247
2020/0322176 A1* 10/2020 Bhandari ................ H04L 9/0825
2020/0322386 A1* 10/2020 Mani ................ H04L 9/3234
2020/0364368 A1* 11/2020 Matetic ................ G06F 21/31
2020/0374700 A1* 11/2020 Smith ................ H04L 9/3268
2020/0389321 A1* 12/2020 Fletcher ................ H04L 9/0618
2020/0396092 A1* 12/2020 Cambou ................ H04L 9/0869
2020/0409572 A1* 12/2020 Orlando ................ G06F 21/72
2021/0004786 A1* 1/2021 Mossler ................ H04L 9/3073
2021/0006395 A1* 1/2021 Durham ................ H04L 9/0861
2021/0011741 A1* 1/2021 Bartfai-Walcott ................ H04L 9/3268
2021/0021431 A1* 1/2021 Guim Bernat ................ H04L 9/3239
2021/0034790 A1* 2/2021 Charles ................ H04L 9/0825
2021/0064254 A1* 3/2021 Durham ................ G06F 21/64
2021/0067377 A1* 3/2021 Beck ................ H04L 9/14
2021/0067559 A1* 3/2021 Coleman ................ G06F 16/254
2021/0083675 A1* 3/2021 Chandra ................ G06F 11/3656
2021/0111863 A1* 4/2021 Trivedi ................ G06F 11/0709
2021/0111892 A1* 4/2021 Vahldiek-Oberwagner ................ G06F 21/57
2021/0112073 A1* 4/2021 Schulz ................ G06F 9/505
2021/0150065 A1* 5/2021 Qiu ................ G06Q 20/02
2021/0150524 A1* 5/2021 Yan ................ G06F 21/602
2021/0152531 A1* 5/2021 Pan ................ H04W 4/44
2021/0176255 A1* 6/2021 Hill ................ H04L 9/3234
2021/0182436 A1* 6/2021 Bennison ................ G06F 21/71
2021/0209614 A1* 7/2021 Bakalis ................ G06Q 10/0833
2021/0256164 A1* 8/2021 Loisel ................ H04L 9/0819
2021/0266185 A1* 8/2021 Konda ................ H04L 61/4511
2021/0271751 A1* 9/2021 Fu ................ G06F 21/57
2021/0271982 A1* 9/2021 Lee ................ G06F 16/2365
2021/0273811 A1* 9/2021 Burke ................ G06V 20/46
2021/0273812 A1* 9/2021 Hardin ................ H04L 9/0894
2021/0288944 A1* 9/2021 Petri ................ H04L 67/14
2021/0297411 A1* 9/2021 Keselman ................ H04L 63/0807
2021/0306213 A1* 9/2021 Medvinsky ................ H04L 9/0827
2021/0306256 A1* 9/2021 Ward ................ H04L 45/04
2021/0314161 A1* 10/2021 Voit ................ H04L 9/0869
2021/0314164 A1* 10/2021 Lin ................ H04L 9/14
2021/0326763 A1* 10/2021 Bernat ................ G06N 20/00
2021/0326868 A1* 10/2021 Wang ................ G06Q 20/3827
2021/0326880 A1* 10/2021 Yang ................ H04L 63/0428
2021/0326889 A1* 10/2021 Wang ................ G06Q 20/3825
2021/0328783 A1* 10/2021 Doshi ................ H04L 9/0861
2021/0328791 A1* 10/2021 Wei ................ G06F 21/57
2021/0328806 A1* 10/2021 Yang ................ H04L 9/3247
2021/0334365 A1* 10/2021 Vessels ................ G06F 21/51
2021/0336797 A1* 10/2021 Van Duren ................ H04L 9/3263
2021/0377025 A1* 12/2021 Giraud ................ H04L 9/3066
2021/0377042 A1* 12/2021 Valdez ................ H04L 9/0637
2021/0377224 A1* 12/2021 Soriente ................ H04L 9/3234
2021/0385066 A1* 12/2021 Hearn ................ G06F 16/2379
2021/0397698 A1* 12/2021 Li ................ H04L 9/3263
2021/0397940 A1* 12/2021 Schneider ................ H04L 63/1425
2021/0406386 A1* 12/2021 Ortiz ................ G06N 20/00
2021/0409209 A1* 12/2021 Chhabra ................ H04L 9/0877
2021/0409222 A1* 12/2021 Moran ................ H04L 9/3234
2022/0006620 A1* 1/2022 Bursell ................ H04L 9/0825
2022/0006787 A1* 1/2022 Bursell ................ H04L 9/16
2022/0012042 A1* 1/2022 Doshi ................ H04L 41/082
2022/0012338 A1* 1/2022 Järvinen ................ H04L 9/0822
2022/0085993 A1* 3/2022 Kumar ................ H04L 9/002
2022/0094548 A1* 3/2022 Asveren ................ H04L 9/3213
2022/0103536 A1* 3/2022 Kida ................ H04L 9/0825
2022/0103599 A1* 3/2022 Zheng ................ H04L 41/5054
2022/0109567 A1* 4/2022 Brickell ................ H04L 9/3247
2022/0116224 A1* 4/2022 Guim Bernat ................ H04L 9/3239
2022/0129544 A1* 4/2022 Touitou ................ G06F 21/64
2022/0129565 A1* 4/2022 Zhang ................ H04L 9/3066
2022/0138286 A1* 5/2022 Zage ................ H04L 63/0428 726/26

(56) References Cited

U.S. PATENT DOCUMENTS

2022/0139511 A1* 5/2022 Osborn .................. H04L 9/321 705/2
2022/0141026 A1* 5/2022 Smith .................. H04L 9/0891 713/181
2022/0147995 A1* 5/2022 Wuest .................. H04L 9/3239
2022/0150055 A1* 5/2022 Cui .................. H04L 9/0825
2022/0166608 A1* 5/2022 Sovio .................. H04L 9/3268
2022/0200655 A1* 6/2022 Abdelmoneum .... H04B 1/7136
2022/0217002 A1* 7/2022 Karame .................. H04L 9/083
2022/0224511 A1* 7/2022 Lipinska .............. G06F 9/3001
2022/0231832 A1* 7/2022 Hwang .................. G06F 21/78
2022/0245238 A1* 8/2022 Dasen .................. H04L 9/3247
2022/0255916 A1* 8/2022 Smith .................. H04L 9/3247
2022/0286846 A1* 9/2022 Arkko .................. H04L 9/14
2022/0303123 A1* 9/2022 Cabre .................. H04L 9/0825
2022/0309182 A1* 9/2022 Zao .................. G06F 21/53
2022/0321361 A1* 10/2022 Ruan .................. H04L 9/0866
2022/0321362 A1* 10/2022 Konda .................. G06F 21/57
2022/0360450 A1* 11/2022 Brandenburger ..... H04L 9/0894
2022/0360608 A1* 11/2022 Raleigh .................. H04L 12/14
2022/0382885 A1* 12/2022 Durham .............. G06F 12/0646
2022/0407689 A1* 12/2022 Jeuk .................. H04L 9/0643
2022/0408243 A1* 12/2022 Mattsson .............. H04W 12/40
2022/0414978 A1* 12/2022 Goodsitt .......... G06K 19/06037
2023/0013780 A1* 1/2023 Gustafsson ........... G06F 21/105
2023/0014894 A1* 1/2023 M M .................. H04L 67/10
2023/0044731 A1* 2/2023 Buendgen ............. H04L 9/3247
2023/0059348 A1* 2/2023 McBride .................. H04L 45/04
2023/0074475 A1* 3/2023 Mullins .................. G06F 21/53
2023/0087217 A1* 3/2023 Sohanghpurwala .... G06F 21/64 713/176
2023/0114566 A1* 4/2023 Carson .................. H04L 9/3239 713/176
2023/0153905 A1* 5/2023 Sanchez ................. G06Q 40/04 705/37
2023/0177154 A1* 6/2023 Vogel .................. H04L 9/0631 726/23
2023/0187371 A1* 6/2023 Parker .................. H04L 9/3278 438/401
2023/0188340 A1* 6/2023 Osborn .............. G06Q 20/3829 380/286
2023/0205934 A1* 6/2023 Villegas .................. G06F 21/44 726/26
2023/0229778 A1* 7/2023 Terpstra .................. G06F 21/73 713/2
2023/0239150 A1* 7/2023 Cheng .................. H04L 9/3213 713/168
2023/0259627 A1* 8/2023 Santan ................ G06F 13/1642 726/26
2023/0319571 A1* 10/2023 Jost .................. H04L 67/56 455/410
2023/0344649 A1* 10/2023 Zamani .............. G06Q 20/3227
2023/0367923 A1* 11/2023 Yang .................. H04L 9/3247
2023/0394129 A1* 12/2023 Boyapalle ............. H04L 9/3247
2023/0394150 A1* 12/2023 Schmatz .................. G06F 21/57
2023/0421371 A1* 12/2023 Gomes De Sousa Bento Bessa .. H04L 9/0825
2024/0004770 A1* 1/2024 Poornachandran ..... G06F 11/27
2024/0031799 A1* 1/2024 Salmela ................ H04L 9/3073
2024/0073693 A1* 2/2024 Vachnish .............. H04L 9/3268
2024/0110975 A1* 4/2024 Kurts .................. H04L 9/0631
2024/0144232 A1* 5/2024 White .................. G06Q 20/409
2024/0171387 A1* 5/2024 Zwanzger ........... G06F 21/6218
2024/0205198 A1* 6/2024 Sood .................. H04L 63/0428
2024/0273411 A1* 8/2024 Mueck .................. H04L 9/3263
2024/0281046 A1* 8/2024 Swierk .................. G06F 1/3206
2024/0284142 A1* 8/2024 Kondapi ............... G06F 1/1632
2024/0289140 A1* 8/2024 Hamlin ............... G06F 9/44505
2024/0289443 A1* 8/2024 Swierk .................. G06F 21/572
2024/0289497 A1* 8/2024 Kondapi ................. G06F 21/84
2024/0289498 A1* 8/2024 Kondapi ................. G06F 21/84
2024/0292169 A1* 8/2024 Kondapi ................. G06F 3/165
2025/0004525 A1* 1/2025 Montero ............... G06F 1/3206
2025/0004527 A1* 1/2025 Montero ............... G06F 1/3206
2025/0004529 A1* 1/2025 Montero ............... G06F 1/3209
2025/0004537 A1* 1/2025 Montero .................. G06F 1/14
2025/0004538 A1* 1/2025 Montero ............... G06F 1/3275
2025/0004539 A1* 1/2025 Montero ............... G06F 9/4408
2025/0004973 A1* 1/2025 Montero ................. G06F 13/42
2025/0005158 A1* 1/2025 Montero ................. G06F 21/52
2025/0007830 A1* 1/2025 Montero ................. H04L 45/44
2025/0007831 A1* 1/2025 Montero ................. H04L 45/74
2025/0015989 A1* 1/2025 Marseille .................. H04L 9/14
2025/0016200 A1* 1/2025 Lindskog ................ G06F 21/57
2025/0044853 A1* 2/2025 Montero ............... G06F 1/3206
2025/0044978 A1* 2/2025 Montero ............... G06F 3/0679
2025/0044985 A1* 2/2025 Montero ................. G06F 1/206
2025/0045061 A1* 2/2025 Montero ............... G06F 9/4403
2025/0045062 A1* 2/2025 Montero ............... G06F 9/4411
2025/0045064 A1* 2/2025 Montero ............. G06F 12/0891
2025/0045142 A1* 2/2025 Montero ............... G06F 21/554
2025/0045143 A1* 2/2025 Montero ............. G06F 15/7867
2025/0045218 A1* 2/2025 Montero ............. G06F 13/1673
2025/0045235 A1* 2/2025 Montero ............. G06F 13/4022
2025/0045383 A1* 2/2025 Montero ................. G06F 13/42
2025/0045400 A1* 2/2025 Montero ............... G06F 21/572
2025/0047500 A1* 2/2025 Montero ............... H04L 9/3247
2025/0047615 A1* 2/2025 Montero ............... H04L 47/365
2025/0047713 A1* 2/2025 Montero ................. H04L 63/18
2025/0047744 A1* 2/2025 Montero ............... H04L 67/025
2025/0047816 A1* 2/2025 Montero .................. G06F 9/24
2025/0055681 A1* 2/2025 Ince ................... G06F 21/602
2025/0094601 A1* 3/2025 Kar ..................... G06F 21/57
2025/0097260 A1* 3/2025 Rozenbaum ........ H04L 63/1458
2025/0097261 A1* 3/2025 Rozenbaum ........ H04L 63/1458
2025/0150285 A1* 5/2025 Aytek .................... G06F 8/65
2025/0155951 A1* 5/2025 Sayyed ................. G06F 1/1635
2025/0156194 A1* 5/2025 Sayyed ................. G06F 21/572
2025/0156263 A1* 5/2025 Sayyed ................. G06F 11/004
2025/0156264 A1* 5/2025 Sayyed ............... G06F 11/0751
2025/0173208 A1* 5/2025 Sayyed ............... G06F 11/0778
2025/0173209 A1* 5/2025 Sayyed ............... G06F 11/0778
2025/0173227 A1* 5/2025 Sayyed ............... G06F 11/1417
2025/0173232 A1* 5/2025 Sayyed ............... G06F 11/2284
2025/0173233 A1* 5/2025 Sayyed .................. G06F 11/27
2025/0173284 A1* 5/2025 Sayyed .................. G06F 13/20
2025/0181433 A1* 6/2025 Sayyed ................. G06F 11/008
2025/0181437 A1* 6/2025 Sayyed ............... G06F 11/0745
2025/0181438 A1* 6/2025 Sayyed ............... G06F 11/0784
2025/0181439 A1* 6/2025 Sayyed ............... G06F 11/0787
2025/0181440 A1* 6/2025 Abdelhalim ........ G06F 11/0787
2025/0181441 A1* 6/2025 Hamlin ................. G06F 11/004
2025/0181469 A1* 6/2025 Sayyed ............... G06F 11/3065
2025/0190370 A1* 6/2025 B ..................... G06F 12/1408
2025/0209009 A1* 6/2025 Thyagaturu ............. G06F 9/544
2025/0258963 A1* 8/2025 Yao ..................... G06F 21/107
2025/0259085 A1* 8/2025 Crabtree ................ G06N 5/043
2025/0278350 A1* 9/2025 Pappachan .......... G06F 11/3612
2025/0291606 A1* 9/2025 Hamlin ............... G06F 9/44505
2025/0291763 A1* 9/2025 Hamlin ................. G06F 15/177
2025/0291922 A1* 9/2025 Hamlin ................. G06F 21/572
2025/0291923 A1* 9/2025 Hamlin ................. G06F 21/572
2025/0298457 A1* 9/2025 Hamlin ................... G06F 1/206
2025/0298628 A1* 9/2025 Hamlin ................. G06F 1/3203
2025/0298767 A1* 9/2025 Hamlin ................. G06F 13/382
2025/0300855 A1* 9/2025 Hamlin ................... H04L 12/42
2025/0301522 A1* 9/2025 Hamlin ................... H04L 69/22
2025/0306885 A1* 10/2025 Hamlin ..................... G06F 8/61
2025/0306950 A1* 10/2025 Hamlin ..................... G06F 8/65
2025/0306956 A1* 10/2025 Hamlin ............... G06F 9/44505
2025/0306997 A1* 10/2025 Hamlin ................. G06F 9/4893
2025/0307113 A1* 10/2025 Hamlin ............... G06F 11/3604
2025/0307198 A1* 10/2025 Hamlin ............... G06F 13/4221
2025/0307356 A1* 10/2025 Hamlin ................. G06F 21/105
2025/0307404 A1* 10/2025 Hamlin ................. G06F 21/572
2025/0307405 A1* 10/2025 Hamlin ................. G06F 21/572
2025/0307406 A1* 10/2025 Hamlin ................. G06F 21/572
2025/0310125 A1* 10/2025 Hamlin ................. H04L 9/3263
2025/0315091 A1* 10/2025 Montero ............... G06F 1/3206
2025/0315095 A1* 10/2025 Sayyed .................... G06F 1/266
2025/0315175 A1* 10/2025 Sayyed ................. G06F 3/0619
2025/0315176 A1* 10/2025 Sayyed ................. G06F 3/0673
2025/0315268 A1* 10/2025 Sayyed ................. G06F 9/4408

(56) References Cited

U.S. PATENT DOCUMENTS

| | | | | |
|---|---|---|---|---|
| 2025/0315269 | A1* | 10/2025 | Sayyed | G06F 9/4401 |
| 2025/0315270 | A1* | 10/2025 | Sayyed | G06F 9/4411 |
| 2025/0315332 | A1* | 10/2025 | Sayyed | G06F 11/0778 |
| 2025/0315336 | A1* | 10/2025 | Sayyed | G06F 11/3409 |
| 2025/0315353 | A1* | 10/2025 | Sayyed | G06F 11/2284 |
| 2025/0315354 | A1* | 10/2025 | Sayyed | G06F 11/2284 |
| 2025/0315532 | A1* | 10/2025 | Sayyed | G06F 21/575 |
| 2025/0362730 | A1* | 11/2025 | Medicherla | G06F 1/3265 |
| 2025/0362925 | A1* | 11/2025 | Sayyed | G06F 11/2284 |
| 2025/0362928 | A1* | 11/2025 | Sayyed | G06F 9/4416 |
| 2025/0362986 | A1* | 11/2025 | Sayyed | G06F 9/4411 |
| 2025/0362987 | A1* | 11/2025 | Sayyed | G06F 9/541 |
| 2025/0363026 | A1* | 11/2025 | Sayyed | G06F 11/27 |
| 2025/0363027 | A1* | 11/2025 | Sayyed | G06F 11/2284 |
| 2025/0363218 | A1* | 11/2025 | Sayyed | G06F 21/54 |
| 2025/0371141 | A1* | 12/2025 | Vaughn | G06F 21/552 |
| 2025/0377884 | A1* | 12/2025 | Sayyed | G06F 8/656 |
| 2025/0377899 | A1* | 12/2025 | Sayyed | G06F 9/4401 |
| 2025/0377901 | A1* | 12/2025 | Sayyed | G06F 9/4406 |
| 2025/0377902 | A1* | 12/2025 | Montero | G06F 9/4408 |
| 2025/0377903 | A1* | 12/2025 | Sayyed | G06F 9/4408 |
| 2025/0383883 | A1* | 12/2025 | Sayyed | G06F 9/4401 |
| 2025/0383884 | A1* | 12/2025 | Sayyed | G06F 9/4401 |
| 2025/0383893 | A1* | 12/2025 | Medicherla | G06F 9/451 |
| 2025/0384137 | A1* | 12/2025 | Sayyed | G06F 21/572 |
| 2026/0004005 | A1* | 1/2026 | Arora | G06F 21/72 |
| 2026/0017389 | A1* | 1/2026 | Panikkar | G06F 21/604 |
| 2026/0017672 | A1* | 1/2026 | Frye | G06Q 30/0185 |
| 2026/0032003 | A1* | 1/2026 | Kwon | H04L 9/3263 |
| 2026/0050678 | A1* | 2/2026 | Kim | G06F 21/602 |
| 2026/0064211 | A1* | 3/2026 | Kemp | G06F 3/0383 |
| 2026/0072702 | A1* | 3/2026 | Kemp | G06F 9/445 |
| 2026/0072807 | A1* | 3/2026 | Kemp | G06F 3/011 |
| 2026/0077264 | A1* | 3/2026 | McNulty | A63F 13/40 |
| 2026/0079564 | A1* | 3/2026 | Griffith | G06F 3/011 |
| 2026/0143002 | A1* | 5/2026 | Rozenbaum | H04L 63/1458 |
| 2026/0148786 | A1* | 5/2026 | Chang | G11C 17/18 |

OTHER PUBLICATIONS

Pasquier et al."Clouds of Things need Information Flow Control with Hardware Roots of Trust," 2015 IEEE 7th International Conference on Cloud Computing on Cloud Computing Technology and Science, IEEE Computer Society, pp. 467-470 (Year: 2015).*

Kfoury et al."Decentralized Distribution of PCP Mappings Over Blockchain for End-to-End Secure Direct Communications," IEEE Access, pp. 110159-110173 (Year: 2019).*

Feller et al."dcTPM: A Generic Architecture for Dynamic Context Management," pp. 211-216 (Year: 2011).*

Carelli et al."Securing Soft IP Cores in FPGA based Reconfigurable Mobile Heterogenous Systems," IEEE, pp. 1-16 (Year: 2019).*

Ahmed et al."Trusted IP Solution in Multi-Tenant Cloud FPGA Platform," pp. 1-7 (Year: 2022).*

Nabeel et al."2.5D Root of Trust: Secure System-Level Integration of Untrusted Chipsets," pp. 1-15 (Year: 2020).*

Barker, E. , Chen, L. and Davis, R. (2020), "Recommendation for Key-Derivation Methods in Key-Establishment Schemes", NIST Special Publication 800-56C, Revision 2, National Institute of Standards and Technology, Gaithersburg, MD, Aug. 2020, [online], https://doi.org/10.6028/NIST.SP.800-56Cr2 (Accessed Feb. 24, 2023), 41 pages.

Pritikin, et al., "Bootstrapping Remote Secure Key Infrastructure (Brski)," RFC 8995, Standards Track, Internet Engineering Task Force (IETF), May 2021, ISSN: 2070-1721, 116 pages.

TCG, "Hardware Requirements for a Device Identifier Composition Engine," Family "2.0", Level 00, Revision 78, Mar. 22, 2018, 12 pages.

* cited by examiner

ROOTS OF TRUST IN INTELLECTUAL PROPERTY (IP) BLOCKS IN A SYSTEM ON A CHIP (SOC)

FIELD OF THE DISCLOSURE

This disclosure relates generally to security in computing systems, and more particularly, to providing roots of trust in IP blocks in computing systems embodied as a System on a Chip (SoC).

BACKGROUND

SoCs designed and/or manufactured by a system integrator typically include one or more intellectual property (IP) blocks. An IP block, also called a semiconductor intellectual property core (SIP core) or IP core, is a reusable unit of logic, cell, or integrated circuit (IC) layout design that is the intellectual property of one party. IP blocks can be licensed to another party or owned and used by a single party. System integrators of application specific integrated circuits (ASICs) and systems of field programmable gate array (FPGA) logic often use IP blocks as building blocks in computing systems. However, inclusion of IP blocks results in challenges in determining a root of trust (RoT) across one or more IP blocks, how IP blocks can securely collaborate with each other, and how IP blocks can be individually tested for secure interoperability with higher levels of a solution stack in the computing system.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1:
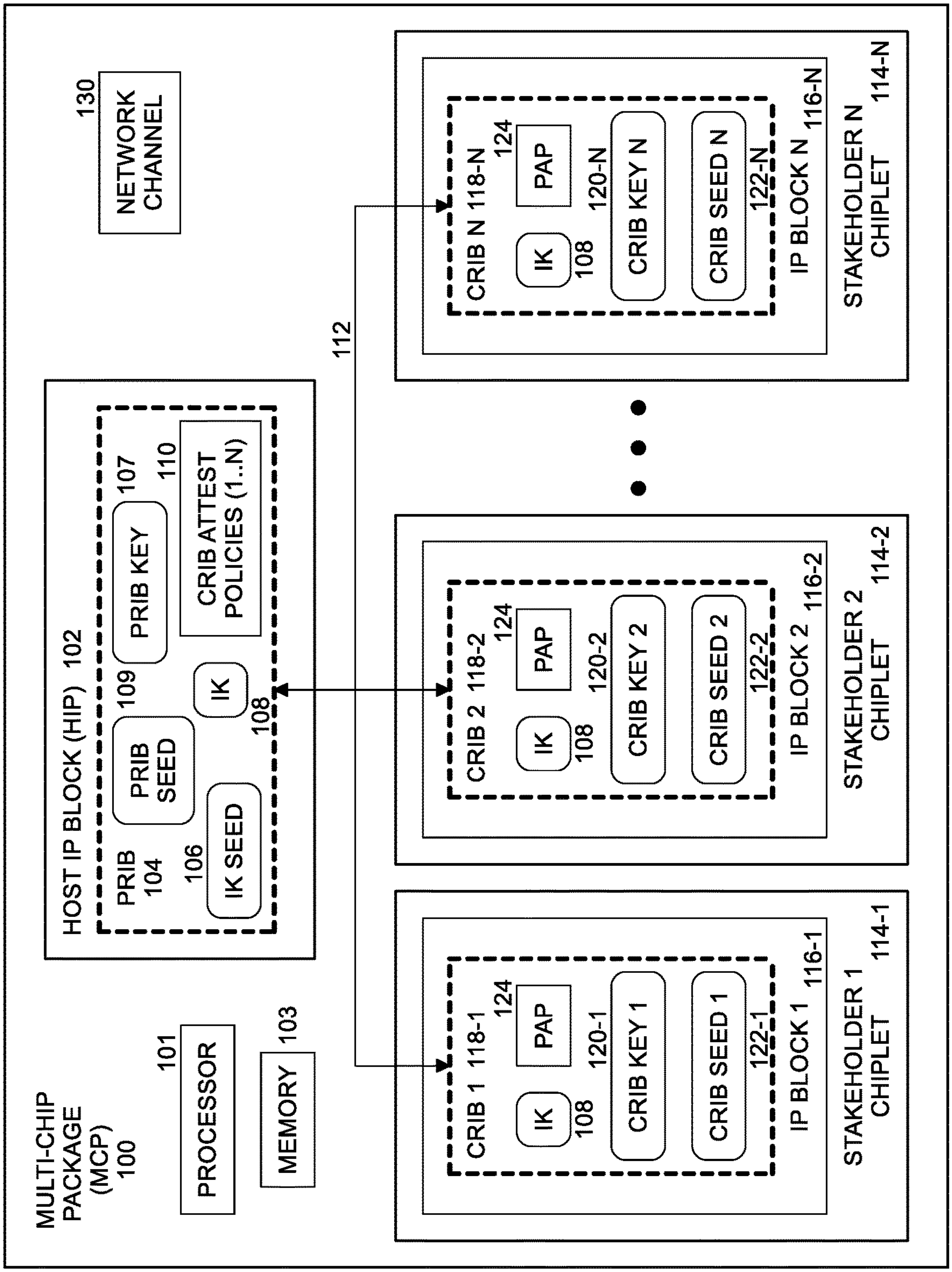
FIG. 1 illustrates a multi-chip package (MCP) according to an example.

The technology described herein provides for establishing a plurality of roots of trust for IP blocks in a multi-chip package (MCP). As used herein, a root of trust (RoT) comprises circuitry and/or executable instructions within the MCP that provides and manages trust between IP blocks in the MCP and other components (including hardware (HW) components and software (SW) components) of the MCP and a computing system including the MCP. The roots of trust for IP blocks may be used to provide secure communications between the IP block and the other components (including components of a solution stack/SW stack of the computing system. Generally, a RoT includes one or more highly reliable HW, firmware, and SW components that perform specific, critical security functions. Because roots of trust are inherently trusted, they must be secure by design. Roots of trust provide a firm foundation from which to build security and trust in a computing system.

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized and that logical, mechanical, electrical and/or other changes may be made without departing from the scope of the subject matter of this disclosure. The following detailed description is, therefore, provided to describe example implementations and not to be taken as limiting on the scope of the subject matter described in this disclosure. Certain features from different aspects of the following description may be combined to form yet new aspects of the subject matter discussed below.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real-world imperfections.

As used herein, "processor circuitry" or "hardware resources" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

As used herein, a computing system can be, for example, a server, a disaggregated server, a personal computer, a workstation, a self-learning machine (e.g., a neural network), a mobile device (e.g., a cell phone, a smart phone, a tablet (such as an iPad™)), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device. A computing system may include one or more dynamic random-access memories (DRAMs) to store data. A computing system may include one or more multi-chip packages (MCPs), with each MCP including one or more IP blocks.

FIG. 1 illustrates a multi-chip package (MCP) 100 according to an example. In an implementation, MCP 100 is embodied as an SoC designed by a system integrator. MCP 100 includes a plurality of components, such as processor 101, memory 103, and other well-known components which have been omitted for clarity from FIG. 1. A host IP (HIP) block 102 provides and manages a RoT of a plurality of IP blocks included in a plurality of chiplets of the MCP, respectively. A chiplet is an integrated circuit (IC) that contains a well-defined functionality. A chiplet is designed to be combined with other chiplets in a single package such as MCP 100. In the example of FIG. 1, the plurality of chiplets in MCP 100 includes stakeholder 1 chiplet 114-1, stakeholder 2 chiplet 114-2, . . . stakeholder N chiplet 114-N, where N is a natural number. MCP 100 may include any number of chiplets. Each chiplet includes at least one IP block. Thus, in the example shown stakeholder 1 chiplet 1 114-1 includes IP block 1 116-1, stakeholder 2 chiplet 114-2 includes IP block 2 116-2, . . . stakeholder N chiplet 114-N includes IP block N 116-N. Although it is implied in the example of Figure that each chiplet is from a different stakeholder (from the set [stakeholder 1, stakeholder 2, . . . stakeholder N]), in various implementations any stakeholder may contribute any number of chiplets to MCP 100, and the number of instances of any particular chiplet on the MCP may be any number. As used herein, a stakeholder is any entity contributing a design of a chiplet having an IP block to the design of the MCP. Although only one IP block is shown in each chiplet in the example of FIG. 1, any chiplet of MCP 100 may have any number of IP blocks.

To implement the roots of trust within the MCP 100, HIP block 102 includes primary RoT IP block (PRIB) 104 and each IP block in a chiplet includes a client RoT IP block (CRIB). For example, IP block 1 116-1 of stakeholder 1 chiplet 114-1 includes CRIB 1 118-1, IP block 2 116-2 of stakeholder 2 chiplet 114-2 includes CRIB 2 118-2, . . . IP block N 116-N of stakeholder N chiplet 114-N includes CRIB N 118-N. MCP 100 includes network channel 130 for HIP block 102 and the CRIBs to securely communicate with entities outside of the MCP.

In an implementation, HIP block 102 manages a fully transparent exercise, at the time of pre-release manufacturing and testing of each CRIB, such that each of the CRIBs can be individually and collectively tested for full interoperability with higher levels of the solution stack of the MCP (and the computing system including the MCP) that contain hardware and software logic modules of which rely on a hardware RoT anchored in each chiplet's CRIB. Fully transparent exercise means that during the testing of the MCP, each CRIB uses a secret integration key (IK) 108 (that is built out of a pair of secrets) for secure and trusted communications with entities external to the MCP, a CRIB key (unique to a CRIB) and PRIB key 107, where PRIB key 107 is furnished by the system integrator and the CRIB key is furnished by the stakeholder providing the chiplet and IP block. For example, CRIB 1 118-1 includes CRIB key 1 120-1, CRIB 2 118-2 includes CRIB key 2 120-2, . . . CRIB N 118-N includes CRIB key N 120-N. The respective CRIB keys furnished by each stakeholder to the system integrator for use in HIP block/CRIB attestation are not shared with other stakeholders or their CRIBs. IK 108 is integrated onto each CRIB of each IP block of each chiplet by the system integrator. IK 108 is based at least in part on IK seed 106. PRIB key 107 is based at least in part on PRIB seed 109, and each CRIB key is based at least in part on a CRIB seed. For example, CRIB key 1 120-1 is based at least in part on CRIB seed 120-1, CRIB key 2 120-2 is based at least in part on CRIB seed 120-2, . . . CRIB key N 120-N is based at least in part on CRIB seed 120-N.

In an implementation, MCP 100 uses a plurality of attestation policies in performing attestation of HIP block 102, and CRIBs 118-1, 118-2, . . . 118-N. HIP block 102 receives CRIB attestation (attest) policies (1 . . . N) 110 from the CRIBs (e.g., a CRIB attestation policy from each CRIB). Any CRIB may have a unique CRIB attestation policy or may share a CRIB attestation policy with any one or more other CRIBs. The system integrator stores a primary attestation policy (PAP) 124, associated with HIP block 102, in each CRIB.

The design of HIP block 102 is transparent and measurable (e.g., verifiable) by each CRIB. This is because the HIP block is designed transparently and transparent testing provides each CRIB 118-1, 118-2, . . . 118-N with the ability to verify that the HIP block 102 is trustworthy. In some cases, the design of the HIP block is publicly available and open for inspection. HIP block 102 manages a secure network channel 130 between any CRIB and an external endpoint, called a peer computing system herein, whose address is furnished to the HIP block by the stakeholder of the CRIB at the point that the CRIB enters a testing and integration phase of MCP 100. In an implementation, the secure network channel 130 may be provided by a computing system baseboard management controller (BMC), a converged security and management engine (CSME), or an air gapped Wireless Credentials Exchange (WCE)), and may communicate through a host computing system, operated by the system integrator, to the peer computing system. In an implementation, the peer computing system may be operated by a stakeholder providing a chiplet including an IP block having a CRIB.

Post-integration, the CRIB may receive a new CRIB key over the secure network channel 130 from the peer computing system (e.g., from the stakeholder owning the CRIB). The new CRIB key is fused into the CRIB by the system integrator after the stakeholder successfully runs tests to verify the integrity of the CRIB. In an implementation, the CRIB key is wrapped by the IK 108 that is furnished to the HIP block 102 and embedded into the HIP block by calling a one-way application programming interface (API) provided by the HIP block. No other CRIB can read the IK 108.

Each CRIB contributes seed material that is used by the PRIB 104 to generate the IK 108. The IK is then shared with each CRIB so that each can act independently within the geographical zone that a CRIB is authorized. The seed material may be derived from the CRIB seed, but in an implementation is not the CRIB seed. CRIB attestation policies 110 in PRIB 104 may exclude one or more of the peer CRIB stakeholders if geo-political circumstances dictate. If there are competing policies, the provisioning entity (usually a manufacturer) resolves the policy disconnects. This may mean a set of MCPs is regionalized.

Post-integration, HIP block 102 communicates requests for challenge-response interactions on behalf of higher-level modules calling the HIP block, and to provide responses from the CRIB that prove to those higher-level modules that the CRIB is a secure RoT. The CRIB provides for countersigning measurements performed by the HIP block of any other host computing system ingredients whose measurements have been uploaded into the HIP block by the system integrator, the host computing system integrator, etc. The higher-level modules may also determine the bootstrapping of secondary/auxiliary CRIB roots of trust and trigger a tandem boot process. A trusted computing base (TCB) recovery may also follow the bootstrapping flow in reverse to recover the TCB by revoking and reissuing the key material. These modules may expose services at the top of the solution stack for reporting specific telemetry data associated with different CRIBs in the MCP for health and performance monitoring of the MCP.

The PRIB 104 and the CRIBs 118-1, 118-2, . . . 118-N contain no proprietary IP from the stakeholder's IP blocks and measurements can be taken of these components and verified within an end-to-end secure network channel 130 that places the system integrator outside the confidential execution of tests that are sent by the stakeholder to CRIBs. The system described herein builds in a public key (e.g., CRIB key) provided by the stakeholder and implements a one-way function that is only known to the stakeholder so that the stakeholder can prevent a malicious or inquisitive system integrator from discovering the interpretation of the tests performed by the stakeholder. The system integrator provides a mechanism by which the stakeholder (e.g., client) of the system integrator can insert the stakeholder's proprietary portion of the communications between the CRIBs and the stakeholder-supplied chiplets.

In a chiplet where one of the chiplets is a root of trust (RoT) for measuring the other chiplets (e.g., a chiplet running a hypervisor), the RoT chiplet also needs to prove to an arbitrary verifier that the RoT chiplet is a legitimate RoT. Normally, this could be done using an embedded key pair that is provisioned at the time of manufacturing the MCP. However, depending on geo-political conditions, a single key pair embedding operation will not satisfy the requirements of all geographies and all political entities. This implies the RoT should have a geo-politically distinct attribute (e.g., a physically unclonable function (PUF)) that has geo-politically distinct manufacturing processes for setting the distinct attribute (e.g., blowing PUF fuses). When a MCP containing this RoT chiplet is onboarded into a geo-political context, the geo-political manufacturing process is applied and results in a distinct change to the RoT chiplet for the MCP for that geography/political environment. The result is that a geo-political-specific attestation event can be created that reveals which geographies have onboarded the chiplet/MCP. Geo-political-specific tests may be asserted that return results when the tester is also in the same geo-political context. A zero-knowledge (ZK) proof may be used to authenticate the test results such that no privacy sensitive information is leaked unless the RoT and the tester are in the same geo-political zone. Sigma protocols may be helpful in constructing the ZK proof. The technology described herein provides for geo-political differentiation of RoT using CRIBs.

While a CRIB is trusted and verified, the register-transfer level (RTL) code defining the IP block could over time still launch attacks against other CRIBs and the HIP block, which necessitates a fabric boundary around each CRIB with well-defined positive address decoding and prevent subtractive address decoding by the CRIB. This may be important in the case of a geographic/political RoT embedded in a CRIB. This boundary also helps to determine the culprit CRIB when a MCP is detected to be under attack and this CRIB is attempting to send data hidden in transactions to a local or remote command center.

The HIP block 102 of MCP 100 shown in FIG. 1 includes primary RoT IP Block (PRIB) 104 that is trusted by all stakeholders. The HIP block achieves broad trust by being an open HW design, subject to public scrutiny. There are multiple stakeholder specific RoT IP blocks (e.g., CRIBs) that may be proprietary (e.g., having stakeholder specific RTL, config, firmware, and design). The CRIBs may be integrated at manufacturing time by the system integrator with other components of the MCP 100. In particular, chiplets 114-1, 114-2, . . . 114-N may be used to facilitate integration. Nevertheless, the overall security of the integration of the chiplets into the MCP is runtime discoverable and attestable. The PRIB 104 provides a single RoT abstraction for interaction with external entities. The PRIB 104 generates interaction key (IK) 108 that defines the unified RoT endpoint. PRIB 104 creates IK 108 by obtaining a seed from each CRIB (e.g., the CRIB seeds) and the PRIB's own seed (PRIB seed 109). In addition to IK 108, each RoT (e.g., each CRIB) may create its own key (e.g., CRIB key) for attestation purposes. Each CRIB attests the PRIB, and the PRIB attests each CRIB. Attestation establishes the identity of the roots of trust. The trust properties of the roots of trust may be made publicly available by the respective stakeholders by publishing a certificate or manifest declaring the trust properties. The results of the attestations applied between the roots of trust is contributed to the key generation steps of IK 108 such that the IK is different if the attested values differ.

In an implementation, the technology described herein may follow Device Identifier Composition Engine (DICE) layering semantics (as described in "Hardware Requirements for a Device Composition Engine" by the Trusted Computing Group, Mar. 22, 2018) where a DICE layer key generation is a function of the DICE layer configuration. In the case of multiple stakeholder chiplets, each CRIB context is a DICE RoT that contributes a RoT specific context (e.g., a seed) to the PRIB layer context. Unlike a traditional DICE "one-to-many fan-out" layering, the technology described herein comprises a "many-to-one fan-in" layering.

Stakeholders provision a CRIB attestation policy into each CRIB that recognizes a specific PRIB 104 and the entity that defined the PRIB (e.g., the system integrator). In an implementation, a computing industry consortium may define the PRIB. In another implementation, the system integrator manufacturing the MCP 100 may provision an attestation policy (e.g., PAP 124) that identifies specific CRIBs that are provisioned to the PRIB. During MCP testing or at first power on of the MCP, the PRIB 104 attests the CRIBs 118-1, 118-2, . . . 118-N and the CRIBs attest the PRIB 104. Following successful attestations, seeds are generated for each RoT and for generation of IK 108 (e.g., IK seed 106). Keys are generated using the seeds and IK 108 is provisioned to each CRIB so that the CRIB can perform RoT functions, if needed, when interacting with external entities. Once setup completes, the RoT in each CRIB is available for normal (e.g., post-integration) operation.

Figure 2:
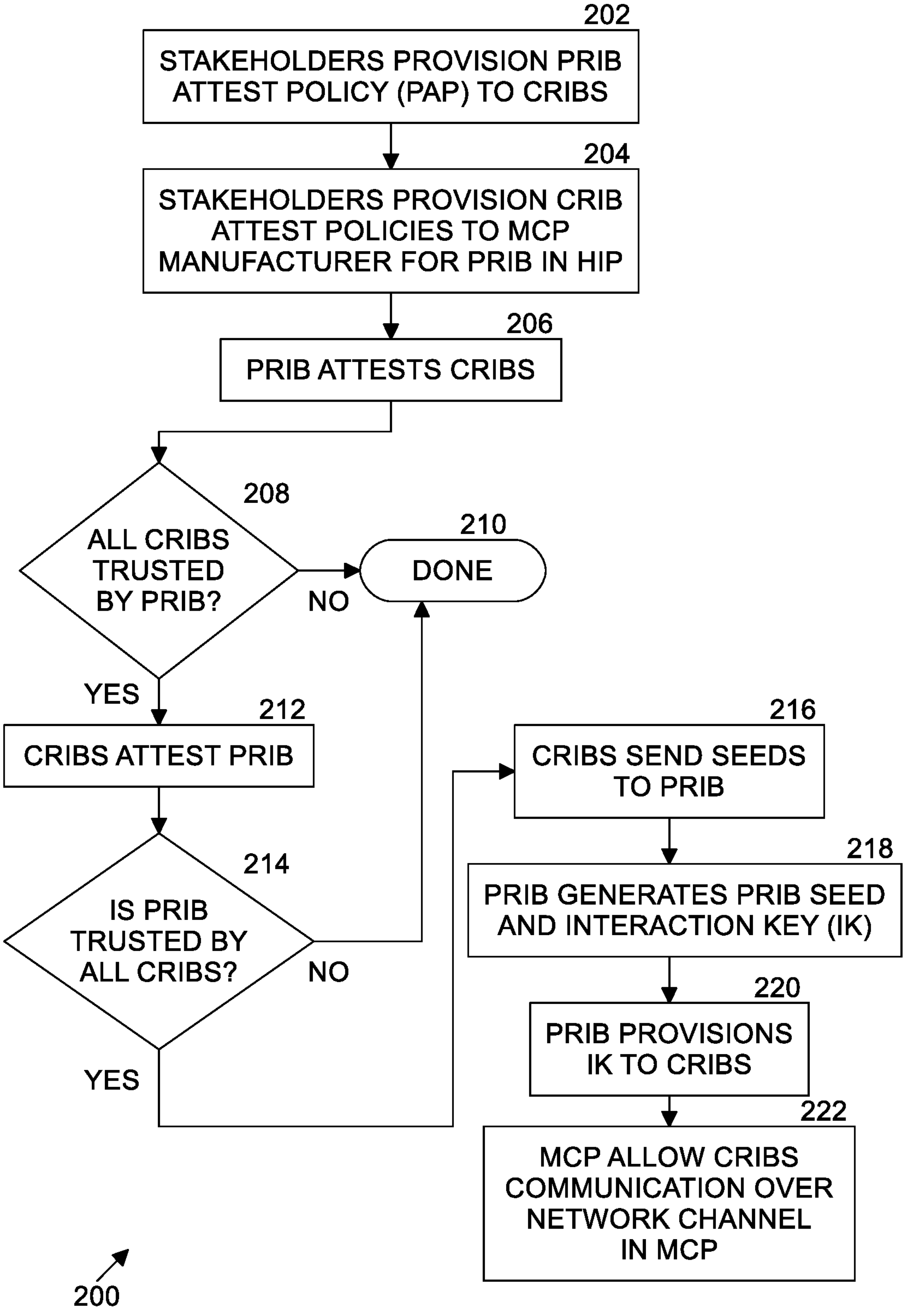
FIG. 2 illustrates RoT initialization processing according to an example.

FIG. 2 illustrates RoT initialization processing 200 according to an example. In an implementation, the actions of FIG. 2 are performed at the time of manufacturing, integration and/or testing of the MCP 100. At block 202, stakeholders (e.g., external entities providing chiplets to the system integrator) provision PRIB attestation policy (PAP) 124 to the CRIBs 118-1, 118-2, . . . 118-N. In various implementations, PAP 124 may be embodied in firmware or hardware. At block 204, the stakeholders provision CRIB attestation policies (1 . . . N) 110 to the MCP manufacturer (e.g., system integrator) for PRIB 104 in HIP block 102 of the MCP 100. At block 206, PRIB 104 attests each CRIB (e.g., CRIB 1 118-1, CRIB 2 118-2, . . . CRIB N 118-N). At block 208, if not all CRIBs are trusted by the PRIB during the attestations, then initialization processing is complete with an error at block 210. At block 208, if all CRIBs based on the attestations of block 206, are trusted by PRIB 104, then at block 212, each of the CRIBs, respectively, attests the PRIB. At block 214, if the PRIB is not trusted by all CRIBs, then initialization processing is complete with an error at block 210. At block 214, if the PRIB is trusted by all CRIBs, then at block 216 the CRIBs 118-1, 118-2, . . . 118-N send their CRIB seeds 122-1, 122-2, . . . 122-N, respectively, to PRIB 104. At block 218, the PRIB 104 generates PRIB seed 109 and IK 108 (based at least in part on IK seed 106). At block 220, PRIB 104 provisions IK 108 to the CRIBs. At block 22, MCP 100 allows the CRIBs to communicate over secure network channel 130 since successful attestation of all CRIBs is complete. Secure and trusted communications between a CRIB and an entity external to the MCP may be protected by encrypted communications with IK 108. Example uses of such secure and trusted communications include provisioning of settings, firmware updates, downloading of workloads that run on the MCP, reporting of telemetry collected from the MCP, etc.

Figure 3:
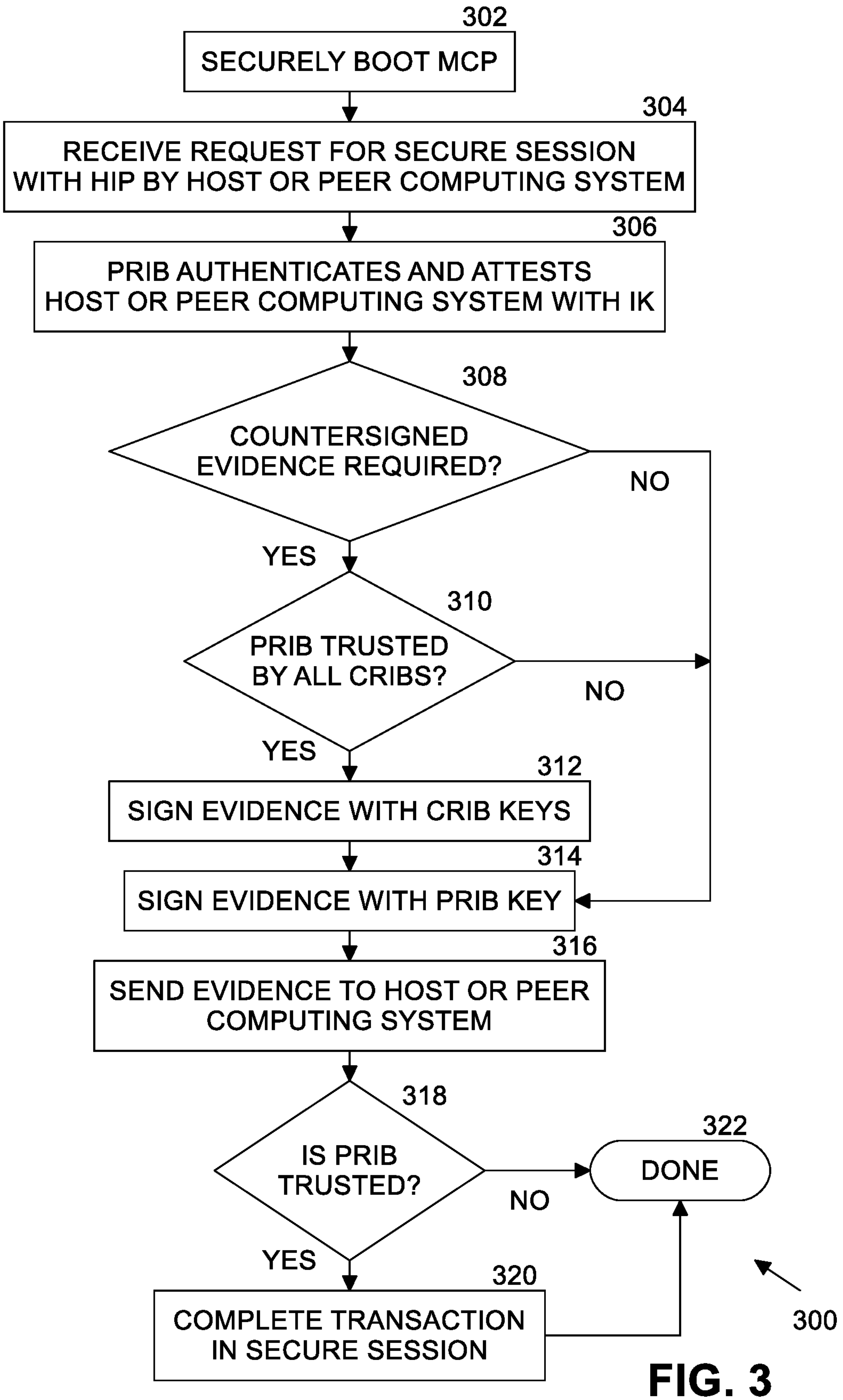
FIG. 3 illustrates RoT processing according to an example.

FIG. 3 illustrates RoT processing 300 according to an example. The HIP block 102 may boot additional FW/SW components of the computing system including the MCP 100 that enable communications to external entities (e.g., other computing systems such as a peer computing system). The HIP block 102 interacts with external entities securely allowing the external entity to attest and authenticate the HIP block using IK 108. Additionally, the external entity may request attestation of the PRIB 104 and each CRIB 118-1, 118-2, . . . 118-N that is in use by using countersigning of evidence collected by the PRIB. If countersigned, each CRIB is requested to sign evidence about the PRIB 104 and/or HIP block 102. This includes the PRIB signing evidence as well. Signed evidence is sent to the requesting external entity who evaluates the signed evidence against expected values. If the HIP block/PRIB and all relevant roots of trust (e.g., CRIBs) are trusted, an application specific purpose for interacting with the HIP block/PRIB may continue.

At block 302, the computing system including the MCP securely boots the MCP. At block 304, the MCP 100 receives a request for a secure communications session with HIP block 102 by a host computing system (e.g., operated by the system integrator) or peer computing system (e.g., operated by a stakeholder). At block 306, PRIB 104 authenticates and attests the requesting computing system (e.g., either a host or peer). At block 308, if countersigned evidence is required, based at least in part on a policy, then at block 310 HIP block 102 determines if PRIB 104 is trusted by all CRIBs (e.g., as previously determined by blocks 212-214 of FIG. 2). Before signing evidence, CRIBs evaluate PRIB trust by measuring the PRIB. This may be done by scanning memory (which may be, for example, multi-port read-only memory). The CRIB attestation policy contains an expected value for the PRIB memory scan result, such as a digest. The digest may be supplied as the PRIB evidence.

If the PRIB is trusted by all CRIBs, then at block 312 the CRIBs sign the evidence with their respective CRIB keys and processing continues with block 314. If at block 308 countersigned evidence is not required or at block 310 the PRIB is not trusted by all CRIBs, then processing continues with block 314. At block 314, HIP block 102 signs the evidence with PRIB key 107. The computing system including the MCP may then be booted. At block 316, HIP block 102 sends the evidence to the requesting computing system (e.g., either host or peer). At block 318, if the PRIB is trusted by the requesting computing system (based at least in part on the PRIB evidence), then at block 320 application specific transactions may be completed during the secure communications session that has been established. Processing then ends at block 322. If the PRIB is not trusted by the requesting computing system, then processing ends at block 322 with no transaction completed.

Figure 4:
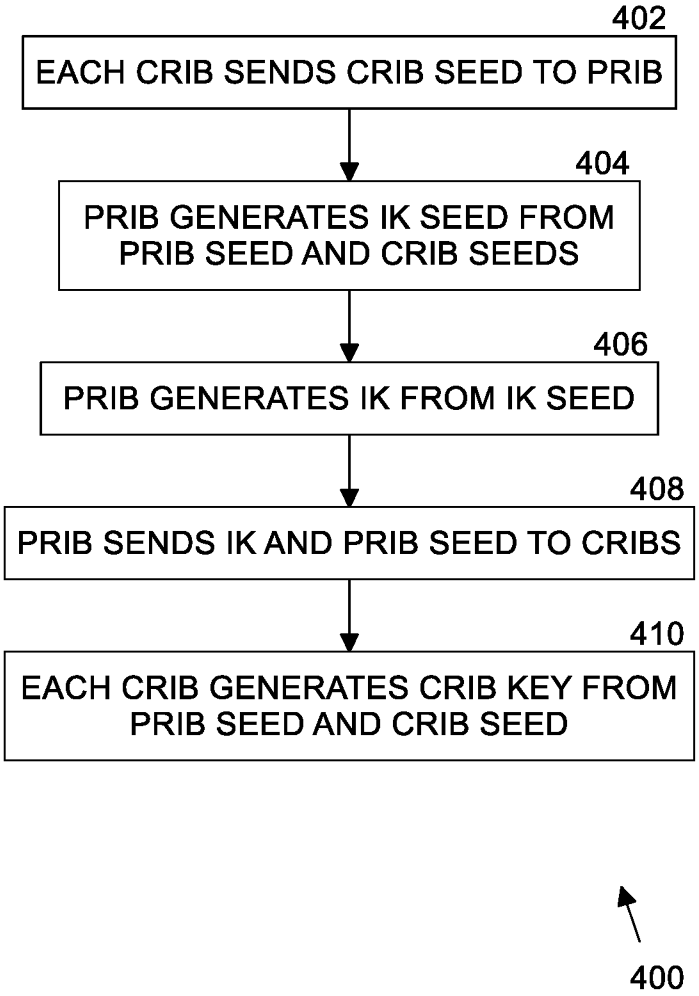
FIG. 4 illustrates seed exchange and key generation processing according to an example.

FIG. 4 illustrates seed exchange and key generation processing 400 according to an example. FIG. 4 provides further details of blocks 216-220 of FIG. 2. At block 402, each CRIB sends its CRIB seed to PRIB 104 (e.g., CRIB 1 118-1 sends CRIB seed 1 120-1, CRIB 2 118-2 sends CRIB seed 2 120-2, . . . CRIB N 118-N sends CRIB seed N 120-N). At block 404, PRIB 104 generates IK seed 106 from PRIB seed 109 and the received CRIB seeds. In an implementation, the IK seed=KeyDerivationFunction(PRIB seed |CRIB 1 seed |CRIB 2 seed | . . . CRIB seed N), where KDF may be implemented as described in "Recommendation for Key-Derivation Methods in Key-Establishment Schemes", SP 800-56C, Rev. 2, by the National Institute of Standards and Technology (NIST), August, 2020. At block 406, PRIB 104 generates IK 108 based at least in part on IK seed 106. In an implementation, IK=KeyGenerationFunction (IK seed |other information), where the other information may include a string that identifies the respective CRIBs that contributed seed material (note that a geo-political policy may exclude a geo-specific CRIB). IK 108 may be a symmetric key, an asymmetric key, or both. At block 408, PRIB 104 sends IK 108 and PRIB seed 109 to the CRIBs. At block 410, each CRIB generates its CRIB key from PRIB seed 109 and its CRIB seed. For example, CRIB 1 118-1 generates CRIB key 1 120-1 from PRIB seed 109 and CRIB seed 1 122-1, CRIB 2 118-2 generates CRIB key 2 120-2 from PRIB seed 109 and CRIB seed 2 122-2, and CRIB N 118-N generates CRIB key N 120-N from PRIB seed 109 and CRIB seed N 122-N.

Figure 5:
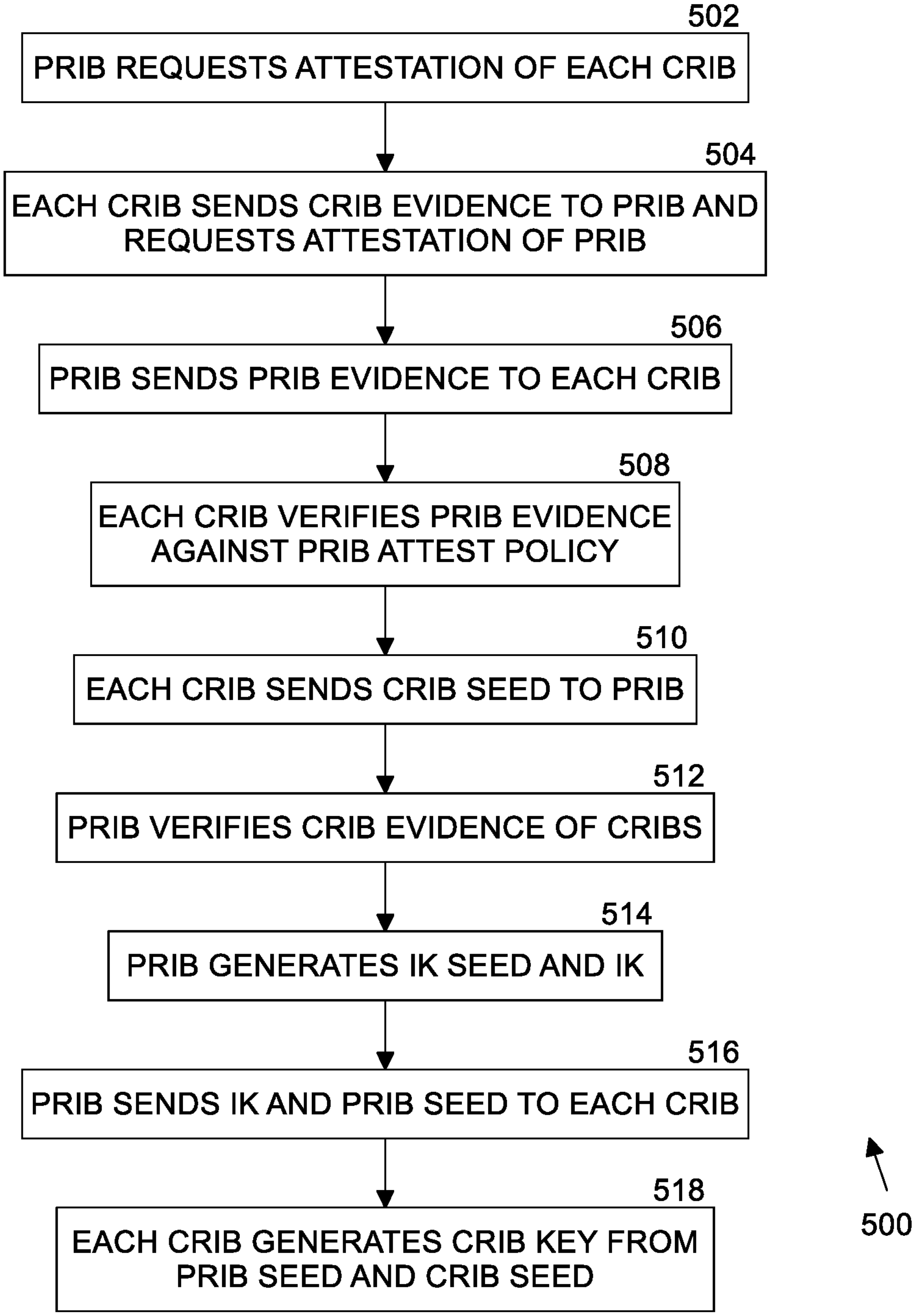
FIG. 5 illustrates attestation exchange processing according to an example.

FIG. 5 illustrates attestation exchange processing 500 according to an example. This attestation exchange dynamically establishes the RoT architecture of MCP 100. At block 502, PRIB 104 requests attestation of each CRIB. At block 504 each CRIB sends CRIB attestation evidence to PRIB 104 and requests attestation evidence of the PRIB. At block 506, PRIB 104 requests each CRIB to collect PRIB measurements as PRIB attestation evidence. At block 508, each CRIB verifies the received PRIB attestation evidence against PRIB attestation policy (PAP) 124. At block 510, if verified, each CRIB sends its CRIB seed to PRIB 104. At block 512, the PRIB verifies the received attestation evidence from each CRIB. If verified, the PRIB generates IK seed 106 and IK 108 (e.g., blocks 404 and 406 of FIG. 4). At block 516, PRIB 104 sends IK 108 and PRIB seed 109 to each CRIB (e.g., block 408 of FIG. 4). At block 518, each CRIB generates its CRIB key from PRIB seed 109 and its CRIB seed (e.g., block 410 of FIG. 4).

The provisioning methods described above allow a CRIB to act independently of a PRIB. For example, if a geopolitical entity doesn't trust PRIB to perform provisioning/re-provisioning, the CRIB specific key can be used.

Figure 6:
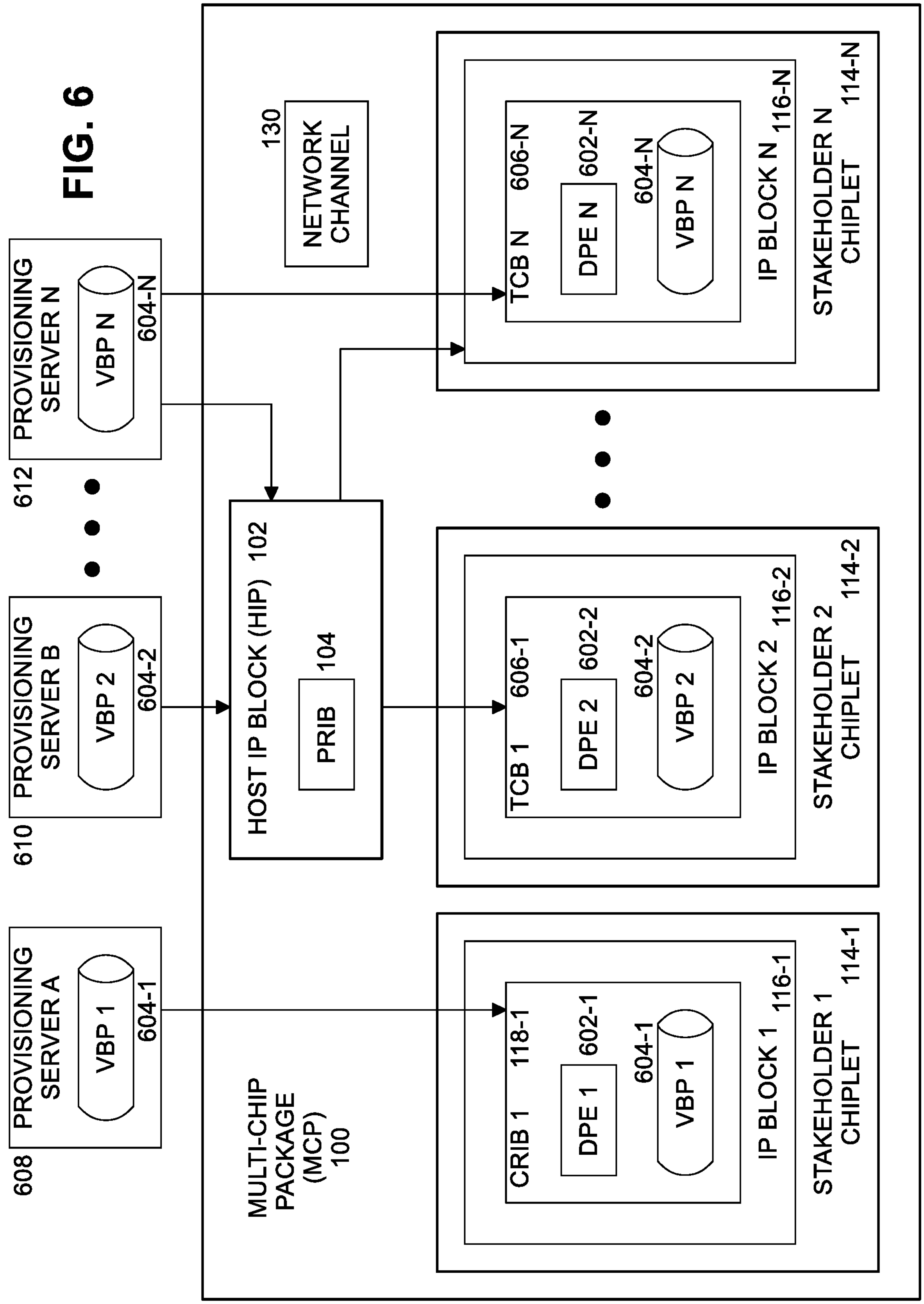
FIG. 6 illustrates a MCP including verified boot and implicit attestation processing according to an example.

FIG. 6 illustrates a MCP 100 including verified boot and implicit attestation processing according to an example. In an implementation, MCP 100 may contain multiple HW RoTs (including one CRIB, such as CRIB 1 118-1 of IP block 1 116-1) where each RoT, other than the CRIB, may have one or more Trusted Computing Base (TCB) layers. A TCB layer may be constructed based at least in part on a verified booting process where the CRIB in one IP block measures the next available TCB in another IP block and compares the actual measurement of the TCB to a stored measurement of the TCB contained in a verified boot policy (VBP). The VBP may contain one or more cryptographic key identifiers or public keys where the private (secret) key (e.g., IK 108) is stored in a secure storage resource such as a Device Identifier Composite Engine (DICE) Protection Engine (DPE).

In the example shown in FIG. 6, stakeholder 1 chiplet 114-1 includes IP block 1 116-1 having CRIB 1 118-1. CRIB 1 118-1 includes DPE 1 602-1 and VBP 1 604-1. CRIB 1 118-1 receives VBP 1 604-1, for example, from a provisioning server A 608. Other stakeholder chiplets may include TCBs instead of CRIBs. For example, stakeholder chiplet 2 114-2 includes IP block 2 116-2 having TCB 1 606-1, which includes DPE 2 602-2 and VBP 2 604-2, . . . stakeholder chiplet N 114-N includes IP block N 116-2 having TCB N 606-N, which includes DPE N 602-N and VBP N 604-N. TCB 1 606-1 receives VBP 2 604-2 from provisioning server B 610, . . . TCB N 606-N receives VBP N 604-N from provisioning server N 612. Although it maybe implied from FIG. 6 that a provisioning server has a one-to-one relationship with a TCB, in other implementations a provisioning server may provision a VBP to more than one TCB. In an implementation, provisioning servers may be operated by stakeholders who determine a VBP and provide chiplets to the MCP. Further, any stakeholder chiplet may also include firmware, where the firmware may be executed in a protected environment of a different stakeholder's chiplet. Thus, one or more of the stakeholders shown in FIG. 1 may be different than one or more of the stakeholders shown in FIG. 6.

Any TCB of FIG. 6 may be a software or firmware component that implements a secure communications protocol (such as Security Protocol and Data Model (SPDM) as described in SPDM Specification 1.2.0, Jan. 6, 2022, from Distributed Management Task Force (DTMF)) that may implement the functionality of network channel 130. The IK 108 may be used with the SPDM to attest the MCP 100 and to protect data transferred over the network channel in a secure communication session.

A verified boot verifier capability in the CRIB may accept a signed statement (e.g., attestation evidence signed with IK 108) from the to-be-verified TCB that indicates that the TCB is trusted. The DPE may be operationally active while the rest of the TCB environment is still operationally inactive. The CRIB verifies the measurement or signed statement using the provisioned policy from the VBP for the TCB that may be integrity protected by a signing key (e.g., an IK 108) that is protected within a DPE. The DPE may be an isolated storage and execution environment that may consist of a processor mode, a physical, logical, or virtually segmented memory, fuses, PUFs, FPGA design or other hardware-backed technique for limiting attack exposure to the DPE. The CRIB and/or TCB uses the stakeholder's public key to authorize use of firmware, including a basic input/output system (BIOS) from an original equipment manufacturer (OEM), original device manufacturer (ODM), system integrator, or government entity, for use in deployment. The stakeholder sets a VBP suitable for deployment to a stakeholder's chiplet, which is then measured as shown. In an implementation, the VBP includes authorized keys, authorized firmware images, revocation support, and authorized debug access.

The MCP may contain PRIB 104 in HIP block 102 that exposes an interface to outside entities (e.g., host computing system or peer computing systems) that may be used to indirectly provision a CRIB or a TCB with a VBP. A MCP may expose an interface directly to a CRIB or IP block containing a TCB. A MCP may also expose a hybrid interface over which either direct or indirect policy provisioning may be performed. Generally, MCP 100 may comprise one or more chiplets (e.g., stakeholder chiplet 1 114-1) containing one or more roots of trust (e.g., CRIB 1 118-1) and or one or more chiplets containing a TCB and DPE hardware, firmware, or software (e.g., stakeholder chiplet 2 114-2, . . . stakeholder chiplet N 114-N, with each chiplet including an IP block having a TCB).

In the example shown in FIG. 6, provisioning server A 608 provisions VBP 1 604-1 to CRIB 1 118-1 in a direct provisioning method (e.g., directly from the provisioning server to the CRIB), provisioning server B 610 provisions VBP 2 604-2 to TCB 1 606-1 in an indirect provisioning method (e.g., indirectly from the provisioning server to the HIP block 102 to the TCB 1 606-1), and provisioning server N 612 provisions VBP N 604-N to TCB N 606-N in a hybrid provisioning method (e.g., wherein the provisioning server N 612 provisions VBP N 604-N indirectly using HIP block 102 or directly using TCB N 606-N).

Thus, a CRIB or TCB (containing a DPE) may obtain a VBP object. A stakeholder provisions a VBP using a DPE provisioning interface that is restricted from use except for the provisioning server. Entity restrictions may be implemented by a MCP manufacturer or system integrator provisioning a next SCE. A protocol for managing ownership authority may be defined by the system integrator policy (e.g., secure device onboard) and/or, for example, as described by "Bootstrapping Remote Secure Key Infrastructure (BRSKI)", available from the Internet Engineering Task Force (IETF) request for proposal (RFC) 8995, May 2021, where a pledge device is provisioned with a voucher that identifies the intended next SCE. The VBP may contain a voucher identifying a next SCE. The VBP is digitally signed (to protect integrity) with IK 108 and may be encrypted (to protect privacy) where the CRIB or TCB receiving the VBP may verify (e.g., decrypt) the VBP using a previously provisioned SCE verification (decryption) key. The CRIB or TCB verifiers (decrypts) the VBP for use during the boot flow of the MCP.

Figure 7:
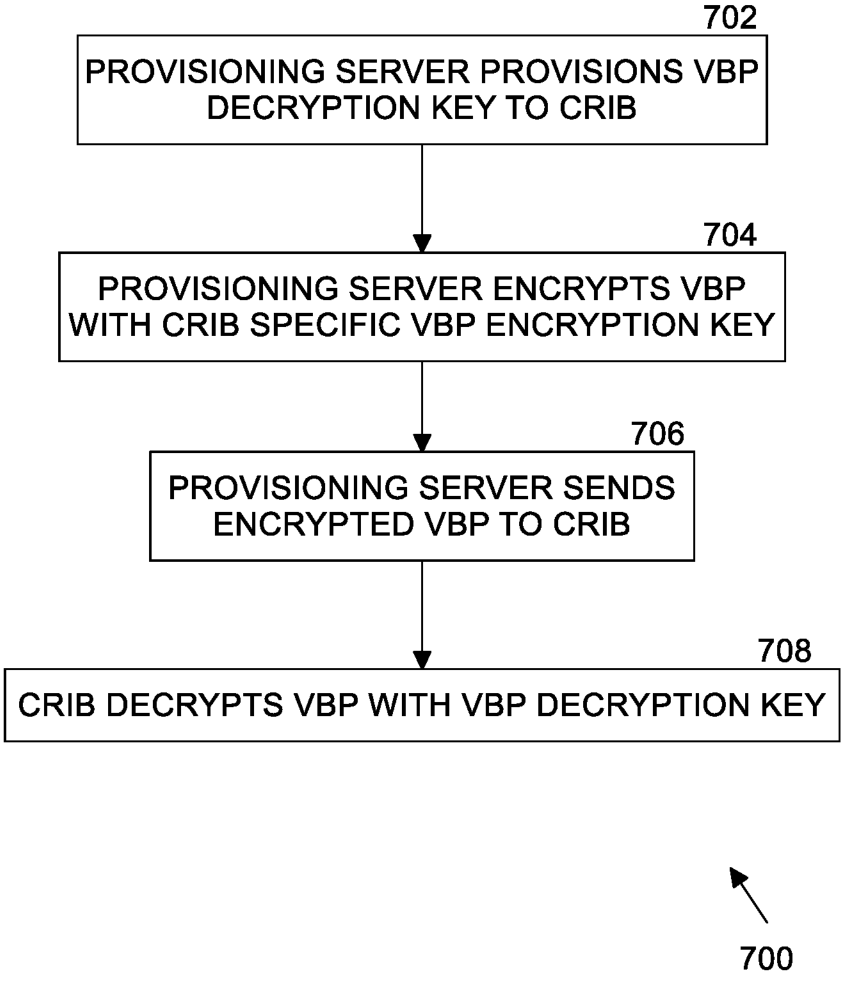
FIG. 7 illustrates manufacturing provisioning processing according to an example.

FIG. 7 illustrates manufacturing provisioning processing 700 according to an example. At block 702, a provisioning server provisions a VBP decryption key to a CRIB. For example, provisioning server A 608 provisions a decryption key for VBP 1 604-1 to CRIB 1 118-1 of IP block 1 116-1 of stakeholder 1 chiplet 114-1. At block 704, the provisioning server encrypts the VBP with a CRIB specific VBP encryption key. At block 706, the provisioning server sends the encrypted VBP (e.g., VBP 1 604-1) to the CRIB. At block 708, the CRIB decrypts the VBP with the VBP decryption key. The CRIB now has access to the VBP.

A CRIB may accept a reset vector such as a power on reset, interrupt, or system generated signal that causes the CRIB (e.g., CRIB 1 118-1) to measure a first TCB (e.g., the TCB 1 606-1). The measurement may be one of the objects described above as contained in the VBP for the first TCB (e.g., TCB 1 606-1). The CRIB compares the measurement of the first TCB with the policy for the first TCB to determine if they match. If there is a match, the first TCB is determined to be trusted, otherwise the first TCB is not trusted and processing ends. Otherwise, processing continues by transitioning operational flow to the first TCB. If there is a next TCB, the boot flow continues for the next TCB until verified booting completes.

Figure 8:
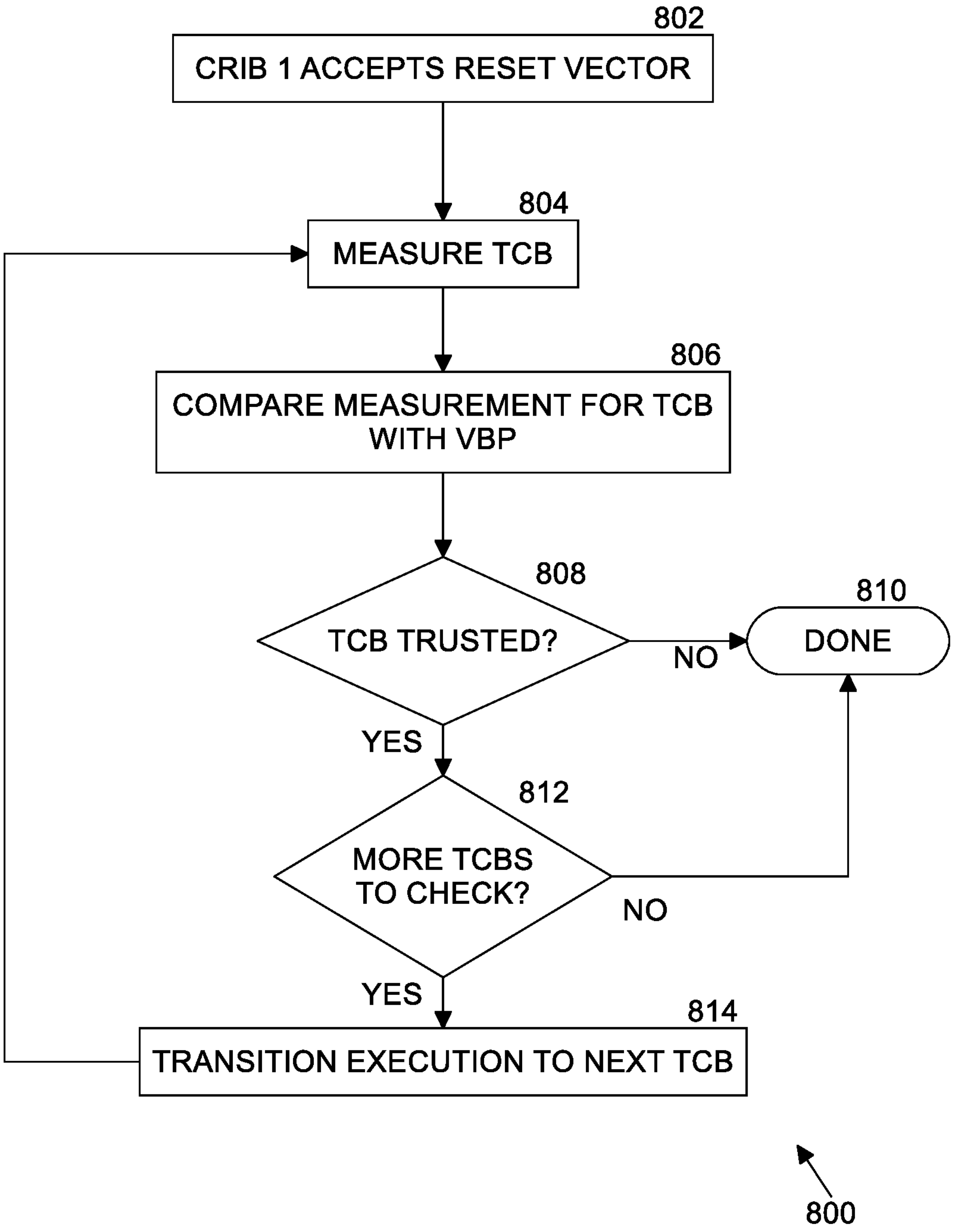
FIG. 8 illustrates boot processing according to an example.

FIG. 8 illustrates boot processing 800 according to an example. At block 802, CRIB 1 118-1 accepts a reset vector for the MCP 100. At block 804, CRIB 1 118-1 measures the first TCB, such as TCB 1 606-1. At block 806, CRIB 1 118-1 compares the measurement of TCB 1 606-1 to a stored measurement in VBP 1 604-1. If the measurements match, TCB 1 606-1 is trusted. If there are more TCBs to check at block 812, then execution transitions to the next TCB and processing continues back at block 804. If the TCB is not trusted at block 808 or there are no more TCBs to check, then processing ends at block 810.

The verified boot method of FIG. 8 may be described as implicit attestation where the successful booting of the MCP provides evidence (or attestation results) of the attestation. In an implementation, MCP_boot=DICE_layers (CRIBx, TCBx1, TCBx2, . . . , TCBxN); where x is a boot path. An implicit attestation may be accompanied by explicit attestation where the collected measurement described above is securely reported to an external entity (e.g., a peer computing system) who also verifies the TCB according to a policy. The MCP 100 may expose an interface (either directly or indirectly) through another module such as the PRIB, where the attestation evidence is shared with an external entity. The combination of implicitly attested boot flow with explicitly attested evidence enables the roots of trust and bootstrapped TCB modules to become trusted in a diverse ecosystem suited to edge computing, Internet of Things (IoT) and cloud computing environments.

Figure 9:
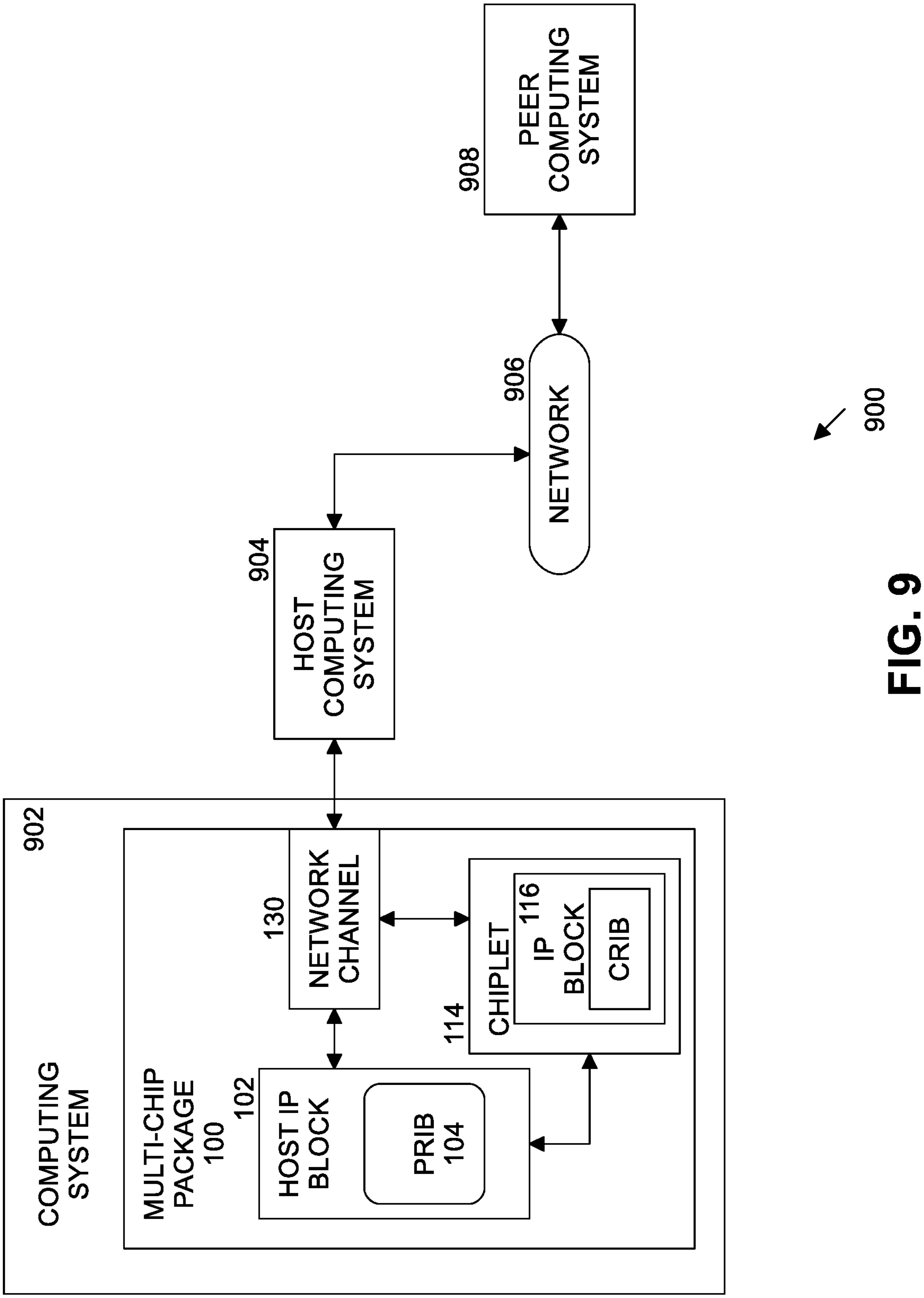
FIG. 9 illustrates a computing arrangement of the MCP and a peer computing system according to an example.

FIG. 9 illustrates a computing arrangement 900 of the MCP 100 and a peer computing system 908 according to an example. MCP 100 may be included in computing system 902. Host computing system 904, operated by a system integrator, may be used by peer computing system 908, operated by a stakeholder, over network 906 (e.g., the Internet) to interact with stakeholder's chiplet 114. For example, the stakeholder may provision PAP 124 to the CRIB of the stakeholder's chiplet, and provision a CRIB attestation policy 110 for the CRIB to PRIB 104 of host IP (HIP) block 102. Peer computing system 908 may be a cloud agent seeking to accelerate a workload using a MCP 100 where the MCP contains a multi-rooted RoT and a measured/verified boot path into a workload hosting environment such as a Software Guard Extensions (SGX) computing environment, a trusted domain extensions (TDX) computing environment, a trusted execution environment (TEE), an FPGA design, an xPU accelerator, etc.

Figure 10:
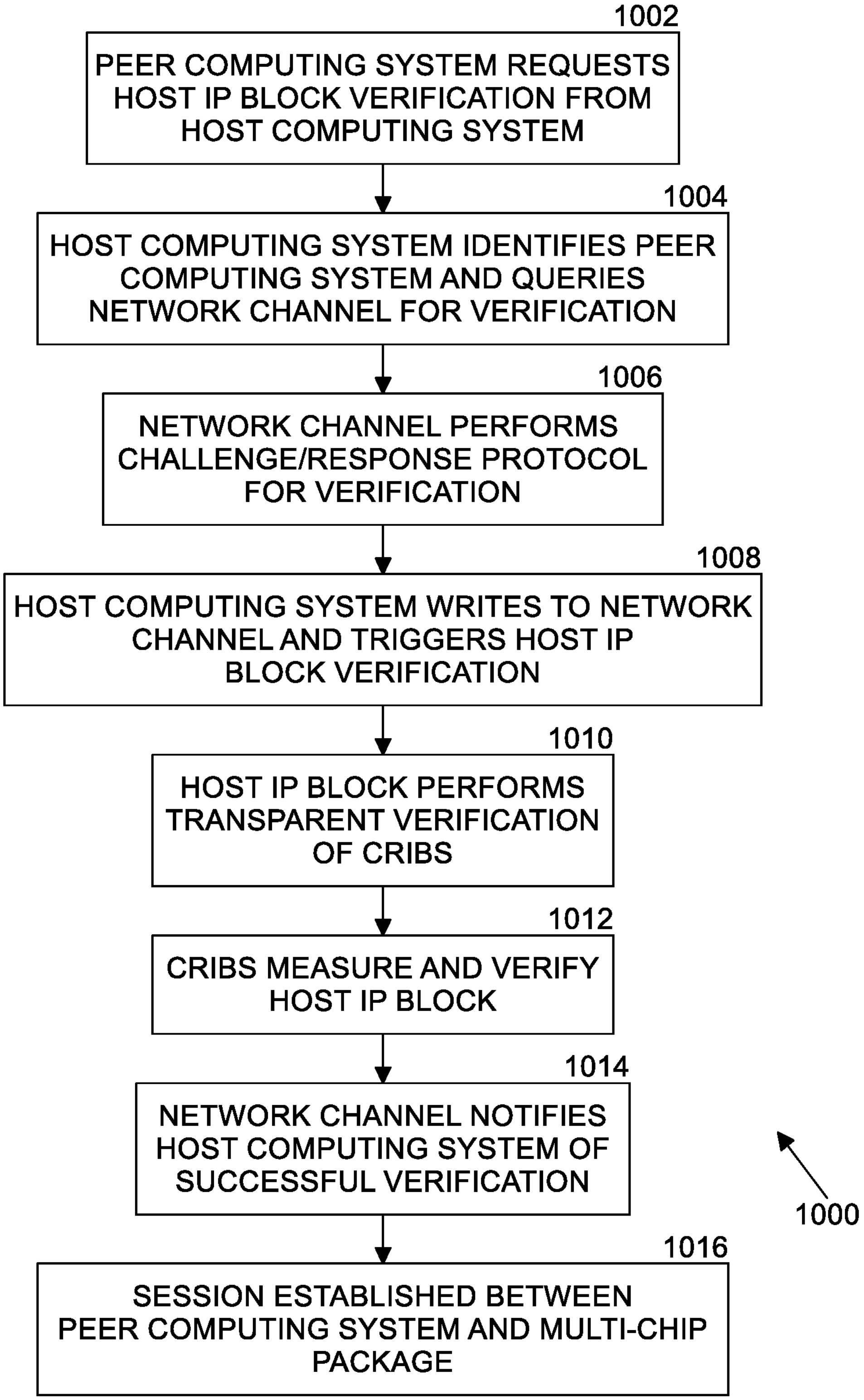
FIG. 10 illustrates processing to establish a secure communications session between the MCP and the peer computing system according to an example.

FIG. 10 illustrates processing 1000 to establish a secure communications session between the MCP 100 and the peer computing system 908 according to an example. At block 1002, peer computing system 908 requests verification of the HIP block 102 from the host computing system 904. At block 1004, the host computing system 904 identifies the peer computing system 908 and queries network channel 130 for verification. At block 1006, network channel 130 performs a challenge/response protocol with the peer computing system for verification. At block 1008, host computing system 904 writes to network channel 130 and triggers HIP block 102 verification. At block 1010, HIP block 102 performs transparent verification of the CRIBs of the MCP 100. At block 1012, the CRIBs measure and verify the HIP block 102. If verification is successful, at block 1014, network channel 130 notifies host computing system 904 of successful verification. If verification is not successful, processing ends. At block 1016, a secure communications session is now established between peer computing system 908 and MCP 100. The peer computing system may now securely provision information such as PAP 124 and CRIB attestation policies to the MCP. In various examples, the secure communications session may use the attested network channel 130 for provisioning, cloud computing, microservices, Internet of Things (IoT) computing, network function hosting, artificial intelligence/machine learning (AI/ML) model training/inference, etc.

While an example manner of implementing the technology described herein is illustrated in FIGS. 1-10, one or more of the elements, processes, and/or devices illustrated in FIGS. 1-10 may be combined, divided, re-arranged, omitted, eliminated, and/or implemented in any other way. Further, the example computing system 902, MCP 100, HIP block 102, and CRIBs may be implemented by hardware, software, firmware, and/or any combination of hardware, software, and/or firmware. Thus, for example, any of computing system 902, the MCP 100, HIP block 102 and CRIBs could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example hardware resources is/are hereby expressly defined to include a non-transitory computer readable storage device or storage disk such as a memory, a digital versatile disk (DVD), a compact disk (CD), a Blu-ray disk, etc., including the software and/or firmware. Further still, the example circuitry of FIGS. 1-10 may include one or more elements, processes, and/or devices in addition to, or instead of, those illustrated in FIGS. 1-10, and/or may include more than one of any or all the illustrated elements, processes and devices.

Diagrams representative of example hardware logic circuitry, machine readable instructions, hardware implemented state machines, and/or any combination thereof is shown in FIGS. 1-10. The machine readable instructions may be one or more executable programs or portion(s) of an executable program for execution by processor circuitry, such as the processor circuitry 1112 shown in the example processor platform 1100 discussed below in connection with FIG. 12 and/or the example processor circuitry discussed below in connection with FIGS. 12 and/or 13. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The tangible machine-readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the diagrams illustrated in FIGS. 1-10, many other methods of implementing the example computing system may alternatively be used. For example, the order of execution of the blocks may be changed, and/or some of the blocks described may be changed, eliminated, or combined. Additionally or alternatively, any or all of the blocks shown in FIGS. 1-10 may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine-readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine-readable instructions may be fragmented and stored on one or more storage devices and/or computing devices (e.g., servers) located at the same or different locations of a network or collection of networks (e.g., in the cloud, in edge devices, etc.). The machine-readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine-readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine-readable instructions may be stored in a state in which they may be read by processor circuitry, but require addition of a library (e.g., a dynamic link library (DLL)), a software development kit (SDK), an application programming interface (API), etc., in order to execute the machine-readable instructions on a particular computing device or other device. In another example, the machine-readable instructions may need to be configured (e.g., settings stored, data input, network addresses recorded, etc.) before the machine-readable instructions and/or the corresponding program(s) can be executed in whole or in part. Thus, machine readable media, as used herein, may include machine readable instructions and/or program(s) regardless of the particular format or state of the machine-readable instructions and/or program(s) when stored or otherwise at rest or in transit.

The machine-readable instructions described herein can be represented by any past, present, or future instruction language, scripting language, programming language, etc. For example, the machine-readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 1-10 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 11:
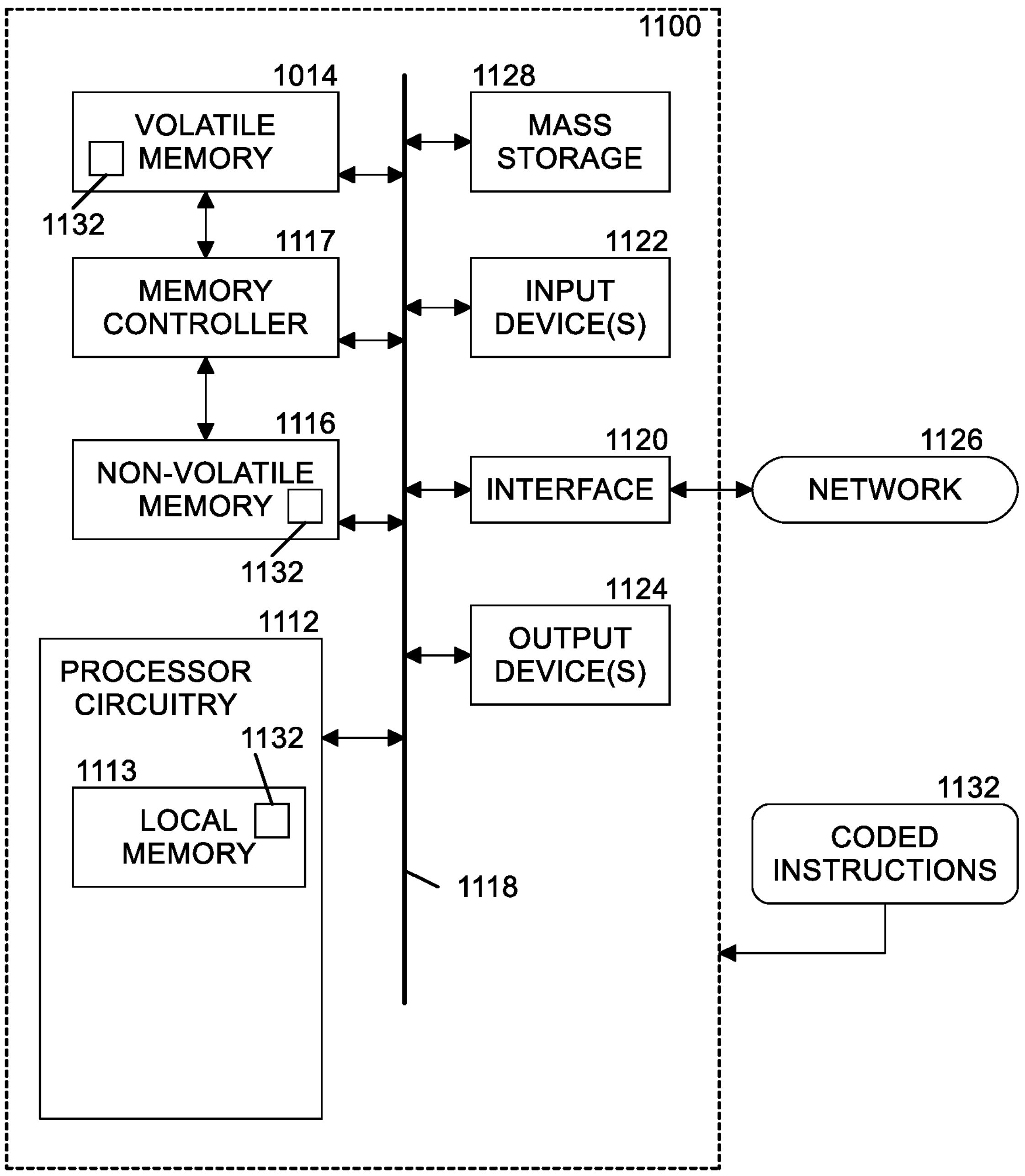
FIG. 11 is a block diagram of an example processor platform structured to execute and/or instantiate the machine-readable instructions and/or operations of FIGS. 1-10 to implement the apparatus discussed with reference to FIGS. 1-10.

FIG. 11 is a block diagram of an example processor platform 1100 structured to execute and/or instantiate the machine-readable instructions and/or operations of FIGS. 1-10. The processor platform 1100 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1100 of the illustrated example includes processor circuitry 1112. The processor circuitry 1112 of the illustrated example is hardware. For example, the processor circuitry 1112 can be implemented by one or more integrated circuits, logic circuits, FPGAs microprocessors, CPUs, GPUs, DSPs, and/or microcontrollers from any desired family or manufacturer. The processor circuitry 1112 may be implemented by one or more semiconductor based (e.g., silicon based) devices. In this example, the processor circuitry 1112 implements the example host IP (HIP) block 102 circuitry and/or CRIBs 118-1, 118-2, . . . 118-N.

The processor circuitry 1112 of the illustrated example includes a local memory 1113 (e.g., a cache, registers, etc.). The processor circuitry 1112 of the illustrated example is in communication with a main memory including a volatile memory 1114 and a non-volatile memory 1116 by a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1116 may be implemented by flash memory and/or any other desired type of memory device. Access to the main memory 1114, 1116 of the illustrated example is controlled by a memory controller 1117.

The processor platform 1100 of the illustrated example also includes interface circuitry 1120. The interface circuitry 1120 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 1122 are connected to the interface circuitry 1120. The input device(s) 1122 permit(s) a user to enter data and/or commands into the processor circuitry 1112. The input device(s) 1122 can be implemented by, for example, an audio sensor, a microphone, a camera (still or video), a keyboard, a button, a mouse, a touchscreen, a trackpad, a trackball, an isopoint device, and/or a voice recognition system.

One or more output devices 1124 are also connected to the interface circuitry 1120 of the illustrated example. The output devices 1124 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1120 of the illustrated example, thus, typically includes a graphics driver card, a graphics driver chip, and/or graphics processor circuitry such as a GPU.

The interface circuitry 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1126. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1100 of the illustrated example also includes one or more mass storage devices 1128 to store software and/or data. Examples of such mass storage devices 1128 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 1132, which may be implemented by the machine-readable instructions of FIGS. 1-10, may be stored in the mass storage device 1128, in the volatile memory 1114, in the non-volatile memory 1116, and/or on a removable non-transitory computer readable storage medium such as a CD or DVD.

Figure 12:
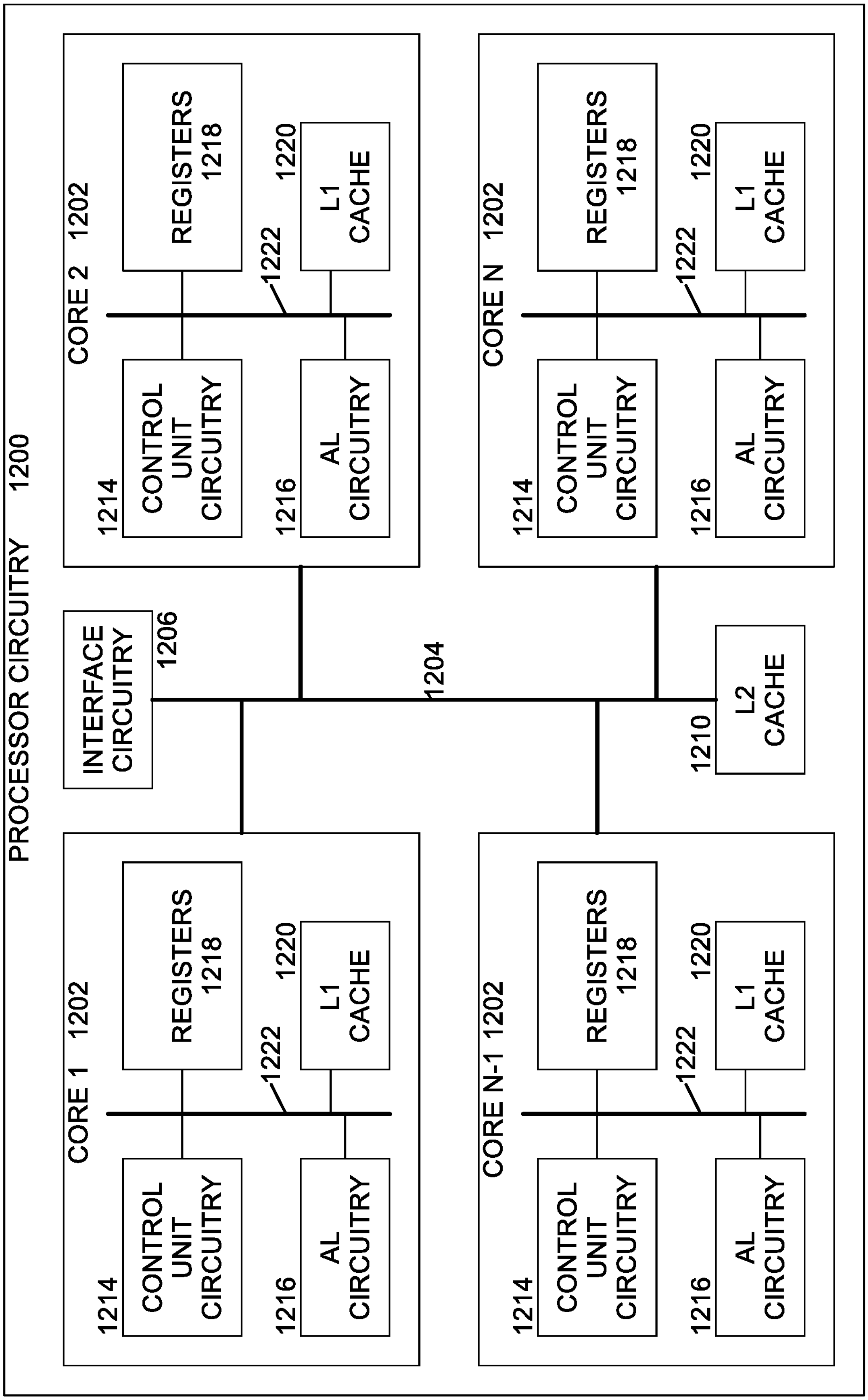
FIG. 12 is a block diagram of an example implementation of the processor circuitry of FIG. 11.

FIG. 12 is a block diagram of an example implementation of the processor circuitry 1112 of FIG. 11. In this example, the processor circuitry 1112 of FIG. 12 is implemented by a microprocessor 1200. For example, the microprocessor 1200 may implement multi-core hardware circuitry such as a CPU, a DSP, a GPU, an XPU, etc. Although it may include any number of example cores 1202 (e.g., 1 core), the microprocessor 1200 of this example is a multi-core semiconductor device including N cores. The cores 1202 of the microprocessor 1200 may operate independently or may cooperate to execute machine readable instructions. For example, machine code corresponding to a firmware program, an embedded software program, or a software program may be executed by one of the cores 1202 or may be executed by multiple ones of the cores 1202 at the same or different times. In some examples, the machine code corresponding to the firmware program, the embedded software program, or the software program is split into threads and executed in parallel by two or more of the cores 1202. The software program may correspond to a portion or all the machine-readable instructions and/or operations represented by the diagrams of FIGS. 1-10.

The cores 1202 may communicate by an example bus 1204. In some examples, the bus 1204 may implement a communication bus to effectuate communication associated with one(s) of the cores 1202. For example, the bus 1204 may implement at least one of an Inter-Integrated Circuit (I2C) bus, a Serial Peripheral Interface (SPI) bus, a PCI bus, or a PCIe bus. Additionally or alternatively, the bus 1204 may implement any other type of computing or electrical bus. The cores 1202 may obtain data, instructions, and/or signals from one or more external devices by example interface circuitry 1206. The cores 1202 may output data, instructions, and/or signals to the one or more external devices by the interface circuitry 1206. Although the cores 1202 of this example include example local memory 1220 (e.g., Level 1 (L1) cache that may be split into an L1 data cache and an L1 instruction cache), the microprocessor 1200 also includes example shared memory 1210 that may be shared by the cores (e.g., Level 2 (L2) cache)) for high-speed access to data and/or instructions. Data and/or instructions may be transferred (e.g., shared) by writing to and/or reading from the shared memory 1210. The local memory 1220 of each of the cores 1202 and the shared memory 1210 may be part of a hierarchy of storage devices including multiple levels of cache memory and the main memory (e.g., the main memory 1114, 1116 of FIG. 11). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1202 may be referred to as a CPU, DSP, GPU, etc., or any other type of hardware circuitry. Each core 1202 includes control unit circuitry 1214, arithmetic and logic (AL) circuitry (sometimes referred to as an ALU) 1216, a plurality of registers 1218, the L1 cache in local memory 1220, and an example bus 1222. Other structures may be present. For example, each core 1202 may include vector unit circuitry, single instruction multiple data (SIMD) unit circuitry, load/store unit (LSU) circuitry, branch/jump unit circuitry, floating-point unit (FPU) circuitry, etc. The control unit circuitry 1214 includes semiconductor-based circuits structured to control (e.g., coordinate) data movement within the corresponding core 1202. The AL circuitry 1216 includes semiconductor-based circuits structured to perform one or more mathematic and/or logic operations on the data within the corresponding core 1202. The AL circuitry 1216 of some examples performs integer-based operations. In other examples, the AL circuitry 1216 also performs floating point operations. In yet other examples, the AL circuitry 1216 may include first AL circuitry that performs integer-based operations and second AL circuitry that performs floating point operations. In some examples, the AL circuitry 1216 may be referred to as an Arithmetic Logic Unit (ALU). The registers 1218 are semiconductor-based structures to store data and/or instructions such as results of one or more of the operations performed by the AL circuitry 1216 of the corresponding core 1202. For example, the registers 1218 may include vector register(s), SIMD register(s), general purpose register(s), flag register(s), segment register(s), machine specific register(s), instruction pointer register(s), control register(s), debug register(s), memory management register(s), machine check register(s), etc. The registers 1218 may be arranged in a bank as shown in FIG. 12. Alternatively, the registers 1218 may be organized in any other arrangement, format, or structure including distributed throughout the core 1202 to shorten access time. The bus 1204 may implement at least one of an I2C bus, a SPI bus, a PCI bus, or a PCIe bus.

Each core 1202 and/or, more generally, the microprocessor 1200 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1200 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general-purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 13:
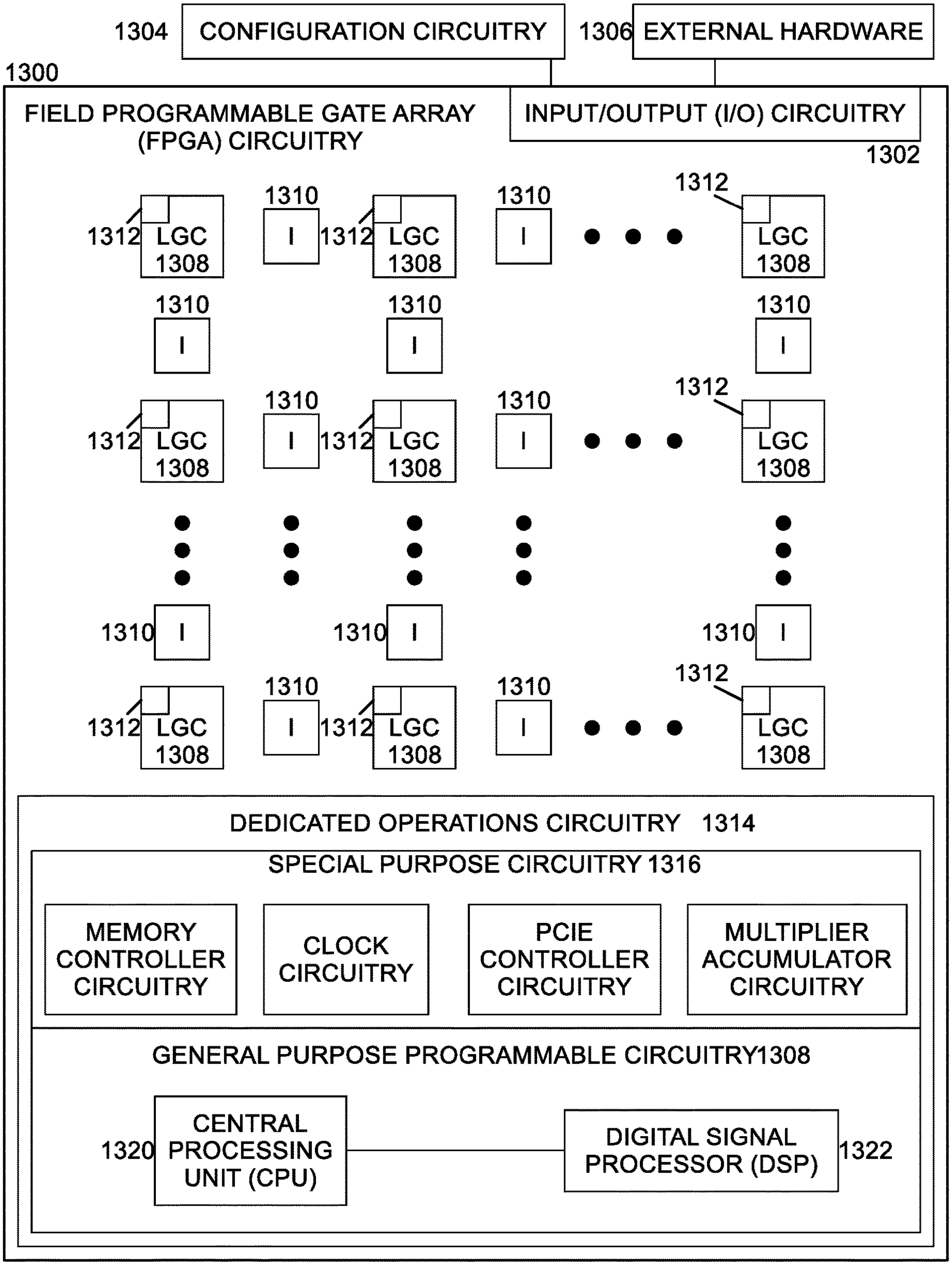
FIG. 13 is a block diagram of another example implementation of the processor circuitry of FIG. 11.

FIG. 13 is a block diagram of another example implementation of the processor circuitry 1112 of FIG. 11. In this example, the processor circuitry 1112 is implemented by FPGA circuitry 1300. The FPGA circuitry 1300 can be used, for example, to perform operations that could otherwise be performed by the example microprocessor 1200 of FIG. 12 executing corresponding machine-readable instructions. However, once configured, the FPGA circuitry 1300 instantiates the machine-readable instructions in hardware and, thus, can often execute the operations faster than they could be performed by a general-purpose microprocessor executing the corresponding software.

More specifically, in contrast to the microprocessor 1200 of FIG. 12 described above (which is a general purpose device that may be programmed to execute some or all of the machine readable instructions represented by the diagrams of FIGS. 1-10 but whose interconnections and logic circuitry are fixed once fabricated), the FPGA circuitry 1300 of the example of FIG. 13 includes interconnections and logic circuitry that may be configured and/or interconnected in different ways after fabrication to instantiate, for example, some or all of the machine readable instructions represented by the diagrams of FIGS. 1-10. In particular, the FPGA 1300 may be thought of as an array of logic gates, interconnections, and switches. The switches can be programmed to change how the logic gates are interconnected by the interconnections, effectively forming one or more dedicated logic circuits (unless and until the FPGA circuitry 1300 is reprogrammed). The configured logic circuits enable the logic gates to cooperate in different ways to perform different operations on data received by input circuitry. Those operations may correspond to some or all of the software represented by the diagrams of FIGS. 1-10. As such, the FPGA circuitry 1300 may be structured to effectively instantiate some or all the machine-readable instructions of the diagrams of FIGS. 1-10 as dedicated logic circuits to perform the operations corresponding to those software instructions in a dedicated manner analogous to an ASIC. Therefore, the FPGA circuitry 1300 may perform the operations corresponding to the some or all the machine-readable instructions of FIGS. 1-10 faster than the general-purpose microprocessor can execute the same.

In the example of FIG. 13, the FPGA circuitry 1300 is structured to be programmed (and/or reprogrammed one or more times) by an end user by a hardware description language (HDL) such as Verilog. The FPGA circuitry 1300 of FIG. 13, includes example input/output (I/O) circuitry 1302 to obtain and/or output data to/from example configuration circuitry 1304 and/or external hardware (e.g., external hardware circuitry) 1306. For example, the configuration circuitry 1304 may implement interface circuitry that may obtain machine readable instructions to configure the FPGA circuitry 1300, or portion(s) thereof. In some such examples, the configuration circuitry 1304 may obtain the machine-readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1306 may implement the microprocessor 1200 of FIG. 12. The FPGA circuitry 1300 also includes an array of example logic gate circuitry 1308, a plurality of example configurable interconnections 1310, and example storage circuitry 1312. The logic gate circuitry 1308 and interconnections 1310 are configurable to instantiate one or more operations that may correspond to at least some of the machine-readable instructions of FIGS. 1-10 and/or other desired operations. The logic gate circuitry 1308 shown in FIG. 13 is fabricated in groups or blocks. Each block includes semiconductor-based electrical structures that may be configured into logic circuits. In some examples, the electrical structures include logic gates (e.g., AND gates, OR gates, NOR gates, etc.) that provide basic building blocks for logic circuits. Electrically controllable switches (e.g., transistors) are present within each of the logic gate circuitry 1308 to enable configuration of the electrical structures and/or the logic gates to form circuits to perform desired operations. The logic gate circuitry 1308 may include other electrical structures such as look-up tables (LUTs), registers (e.g., flip-flops or latches), multiplexers, etc.

The interconnections 1310 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1308 to program desired logic circuits.

The storage circuitry 1312 of the illustrated example is structured to store result(s) of the one or more of the operations performed by corresponding logic gates. The storage circuitry 1312 may be implemented by registers or the like. In the illustrated example, the storage circuitry 1312 is distributed amongst the logic gate circuitry 1308 to facilitate access and increase execution speed.

The example FPGA circuitry 1300 of FIG. 13 also includes example Dedicated Operations Circuitry 1314. In this example, the Dedicated Operations Circuitry 1314 includes special purpose circuitry 1316 that may be invoked to implement commonly used functions to avoid the need to program those functions in the field. Examples of such special purpose circuitry 1316 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1300 may also include example general purpose programmable circuitry 1318 such as an example CPU 1320 and/or an example DSP 1322. Other general purpose programmable circuitry 1318 may additionally or alternatively be present such as a GPU, an XPU, etc., that can be programmed to perform other operations.

Although FIGS. 12 and 13 illustrate two example implementations of the processor circuitry 1112 of FIG. 11, many other approaches are contemplated. For example, as mentioned above, modern FPGA circuitry may include an on-board CPU, such as one or more of the example CPU 1320 of FIG. 13. Therefore, the processor circuitry 1112 of FIG. 11 may additionally be implemented by combining the example microprocessor 1200 of FIG. 12 and the example FPGA circuitry 1300 of FIG. 13. In some such hybrid examples, a first portion of the machine-readable instructions represented by the diagrams of FIGS. 1-10 may be executed by one or more of the cores 1202 of FIG. 12 and a second portion of the machine-readable instructions represented by the diagrams of FIGS. 1-10 may be executed by the FPGA circuitry 1300 of FIG. 13.

In some examples, the processor circuitry 1112 of FIG. 11 may be in one or more packages. For example, the processor circuitry 1200 of FIG. 12 and/or the FPGA circuitry 1300 of FIG. 13 may be in one or more packages. In some examples, an XPU may be implemented by the processor circuitry 1112 of FIG. 11, which may be in one or more packages. For example, the XPU may include a CPU in one package, a DSP in another package, a GPU in yet another package, and an FPGA in still yet another package.

Figure 14:
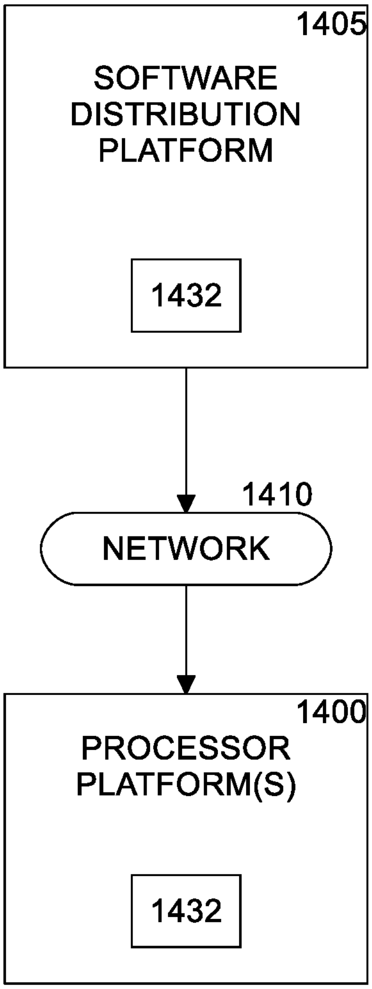
FIG. 14 is a block diagram illustrating an example software distribution platform to distribute software such as the example machine readable instructions of FIG. 11 to hardware devices owned and/or operated by third parties.

A block diagram illustrating an example software distribution platform 1405 to distribute software such as the example machine readable instructions 1132 of FIG. 11 to hardware devices owned and/or operated by third parties is illustrated in FIG. 14. The example software distribution platform 1405 may be implemented by any computer server, data facility, cloud service, etc., capable of storing and transmitting software to other computing devices. The third parties may be customers of the entity owning and/or operating the software distribution platform 1405. For example, the entity that owns and/or operates the software distribution platform 1405 may be a developer, a seller, and/or a licensor of software such as the example machine readable instructions 1132 of FIG. 11. The third parties may be consumers, users, retailers, OEMs, etc., who purchase and/or license the software for use and/or re-sale and/or sub-licensing. In the illustrated example, the software distribution platform 1405 includes one or more servers and one or more storage devices. The storage devices store the machine-readable instructions 1132, which may correspond to the example machine readable instructions, as described above. The one or more servers of the example software distribution platform 1405 are in communication with a network 1410, which may correspond to any one or more of the Internet and/or any of the example networks, etc., described above. In some examples, the one or more servers are responsive to requests to transmit the software to a requesting party as part of a commercial transaction. Payment for the delivery, sale, and/or license of the software may be handled by the one or more servers of the software distribution platform and/or by a third-party payment entity. The servers enable purchasers and/or licensors to download the machine-readable instructions 1132 from the software distribution platform 1405. For example, the software, which may correspond to the example machine readable instructions described above, may be downloaded to the example processor platform 1400, which is to execute the machine-readable instructions 1132 to implement the methods described above and associated computing system 902. In some examples, one or more servers of the software distribution platform 1405 periodically offer, transmit, and/or force updates to the software (e.g., the example machine readable instructions 1132 of FIG. 11) to ensure improvements, patches, updates, etc., are distributed and applied to the software at the end user devices.

In some examples, an apparatus includes means for data processing of FIGS. 1-10. For example, the means for processing may be implemented by processor circuitry, processor circuitry, firmware circuitry, other circuitry, etc. In some examples, the processor circuitry may be implemented by machine executable instructions executed by processor circuitry, which may be implemented by the example processor circuitry 1112 of FIG. 11, the example processor circuitry 1200 of FIG. 12, and/or the example Field Programmable Gate Array (FPGA) circuitry 1300 of FIG. 13. In other examples, the processor circuitry is implemented by other hardware logic circuitry, hardware implemented state machines, and/or any other combination of hardware, software, and/or firmware. For example, the processor circuitry may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

From the foregoing, it will be appreciated that example systems, methods, apparatus, and articles of manufacture have been disclosed that provide trusted security islands in a computing system. The disclosed systems, methods, apparatus, and articles of manufacture improve the security a computing device. The disclosed systems, methods, apparatus, and articles of manufacture are accordingly directed to one or more improvement(s) in the operation of a machine such as a computer or other electronic and/or mechanical device.

EXAMPLES

The following examples pertain to further embodiments. Specifics in the examples may be used anywhere in one or more embodiments. Example 1 is an apparatus including a plurality of intellectual property (IP) blocks; and a host IP block, including a primary root of trust (RoT) IP block (PRIB) coupled to the plurality of IP blocks, to receive a request from a computing system to establish a secure communications session with a selected one of a plurality of intellectual property (IP) blocks, authenticate and attest the computing system, sign evidence of the PRIB with a PRIB key, send the signed evidence of the PRIB to the computing system, and establish the secure communications session between the computing system and the selected IP block if the PRIB is trusted by the computing system based at least in part on the signed evidence of the PRIB.

In Example 2, the subject matter of Example 1 may optionally include wherein the selected IP block includes a client root of trust (RoT) IP block (CRIB) and, if the evidence of the PRIB is required to be countersigned by the CRIB and the PRIB is trusted by the CRIB, the host IP block to sign the evidence of the PRIB with a key of the CRIB before sending the signed evidence of the PRIB to the computing system. In Example 3, the subject matter of Example 2 may optionally include wherein a requirement of countersigning the evidence of the PRIB is included in a CRIB attestation policy stored in the PRIB. In Example 4, the subject matter of Example 2 may optionally include wherein the PRIB is to attest the CRIB, the CRIB is to attest the PRIB, and the PRIB is to determine whether the PRIB is trusted by the CRIB in response to the PRIB successfully attesting the CRIB and the CRIB successfully attesting the PRIB. In Example 5, the subject matter of Example 4 may optionally include wherein the CRIB is to attest the PRIB based at least in part on a primary attestation policy (PAP) stored in the CRIB. In Example 6, the subject matter of Example 2 may optionally include the CRIB to generate the CRIB key based on a CRIB seed stored in the CRIB and a PRIB seed received from the PRIB. In Example 7, the subject matter of Example 6 may optionally include the PRIB to generate the PRIB seed and an interaction key (IK). In Example 8, the subject matter of Example 7 may optionally include the PRIB to receive the CRIB seed from the CRIB, generate an IK seed from the PRIB seed and the CRIB seed, generate the IK from the IK seed, and send the IK to the CRIB. In Example 9, the subject matter of Example 8 may optionally include the CRIB to encrypt information with the IK for secure and trusted communication between the CRIB and the computing system. In Example 10, the subject matter of Example 8 may optionally include the CRIB to sign attestation evidence with the IK during booting of the apparatus. In Example 11, the subject matter of Example 7 may optionally include the CRIB to generate the CRIB key and the PRIB to generate the IK at a time of manufacturing, integration or testing of the apparatus.

Example 12 is a method including receiving, by host intellectual property (IP) block in a multi-chip package (MCP) in a first computing system, a request by a second computing system to establish a secure communications session with a selected one of a plurality of IP blocks of the MCP; authenticating and attesting, by a primary root of trust (RoT) IP block (PRIB) in the MCP, the second computing system; signing, by the host IP block, evidence of the PRIB with a PRIB key; sending, by the host IP block, the signed evidence of the PRIB to the second computing system; and establishing the secure communications session between the second computing system and the selected IP block of the MCP if the PRIB is trusted by the second computing system based at least in part on the signed evidence of the PRIB.

In Example 13, the subject matter of Example 12 may optionally include wherein the selected IP block includes a client RoT IP block (CRIB) and, if the evidence of the PRIB is required to be countersigned by the CRIB and the PRIB is trusted by the CRIB, signing the evidence of the PRIB by the host IP block with a key of the CRIB before sending the signed evidence of the PRIB to the second computing system. In Example 14, the subject matter of Example 13 may optionally include wherein a requirement of countersigning the evidence of the PRIB is included in a CRIB attestation policy stored in the PRIB. In Example 15, the subject matter of Example 13 may optionally include the PRIB attesting the CRIB, the CRIB attesting the PRIB, and determining that the PRIB is trusted by the CRIB in response to the PRIB successfully attesting the CRIB and the CRIB successfully attesting the PRIB. In Example 16, the subject matter of Example 15 may optionally include the CRIB attesting the PRIB based at least in part on a primary attestation policy (PAP) stored in the CRIB. In Example 17, the subject matter of Example 13 may optionally include generating the CRIB key based on a CRIB seed stored in the CRIB and a PRIB seed received from the PRIB. In Example 18, the subject matter of Example 17 may optionally include the PRIB generating the PRIB seed and an interaction key (IK). In Example 19, the subject matter of Example 18 may optionally include the PRIB receiving the CRIB seed from the CRIB, generating an IK seed from the PRIB seed and the CRIB seed, generating the IK from the IK seed, and sending the IK to the CRIB. In Example 20, the subject matter of Example 19 may optionally include encrypting information with the IK for secure and trusted communication between the CRIB and the second computing system. In Example 21, the subject matter of Example 18 may optionally include generating the CRIB key and the IK at a time of manufacturing, integration or testing of the MCP.

Example 22 is at least one machine-readable storage medium comprising instructions which, when executed by at least one processor, cause the at least one processor to receive, by host intellectual property (IP) block in a multichip package (MCP) in a first computing system, a request by a second computing system to establish a secure communications session with a selected one of a plurality of IP blocks of the MCP; authenticate and attest, by a primary root of trust (RoT) IP block (PRIB) in the MCP, the second computing system; sign, by the host IP block, evidence of the PRIB with a PRIB key; send, by the host IP block, the signed evidence of the PRIB to the second computing system; and establish the secure communications session between the second computing system and the selected IP block of the MCP if the PRIB is trusted by the second computing system based at least in part on the signed evidence of the PRIB.

In Example 23, the subject matter of Example 22 may optionally include wherein the selected IP block includes a client RoT IP block (CRIB) and, if the evidence of the PRIB is required to be countersigned by the CRIB and the PRIB is trusted by the CRIB, comprising instructions which, when executed by the at least one processor, cause the at least one processor to sign the evidence of the PRIB by the host IP block with a key of the CRIB before sending the signed evidence of the PRIB to the second computing system. In Example 24, the subject matter of Example 22 may optionally include wherein a requirement of countersigning the evidence of the PRIB is included in a CRIB attestation policy stored in the PRIB. In Example 25, the subject matter of Example 23 may optionally include instructions which, when executed by the at least one processor, cause the at least one processor to cause the PRIB to attest the CRIB, the CRIB to attest the PRIB, and to determine that the PRIB is trusted by the CRIB in response to the PRIB successfully attesting the CRIB and the CRIB successfully attesting the PRIB.

Example 26 is an apparatus operative to perform the method of any one of Examples 12 to 21. Example 27 is an apparatus that includes means for performing the method of any one of Examples 12 to 21. Example 28 is an apparatus that includes any combination of modules and/or units and/or logic and/or circuitry and/or means operative to perform the method of any one of Examples 12 to 21. Example 29 is an optionally non-transitory and/or tangible machine-readable medium, which optionally stores or otherwise provides instructions that if and/or when executed by a computer system or other machine are operative to cause the machine to perform the method of any one of Examples 12 to 21.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the examples of this patent.

What is claimed is:

1. An apparatus comprising:

a plurality of client root of trust (RoT) IP blocks (CRIBs) each contributed by a different stakeholder entity of a plurality of different stakeholder entities; and a host IP core, including:

circuitry to receive a request from a computing system to establish a secure communications session with a first CRIB of the plurality of CRIBs, wherein the computing system corresponds to a stakeholder entity of the plurality of stakeholder entities that contributed the first CRIB;

a primary root of trust (RoT) IP block (PRIB) coupled to the plurality of CRIBs, the PRIB contributed by a system integrator entity that is to integrate the CRIBs into the apparatus, the system integrator entity different than each of the plurality of different stakeholder entities, the PRIB to authenticate and attest the computing system;

circuitry to sign evidence of the PRIB with a PRIB key;

circuitry to sign the evidence of the PRIB with a key of the CRIB, wherein the evidence of the PRIB is required to be countersigned by the CRIB;

circuitry to send a signed evidence of the PRIB, which has been signed with the PRIB key and the key of the CRIB to the computing system; and circuitry to establish the secure communications session between the computing system and the first CRIB if the PRIB is trusted by the computing system based at least in part on the signed evidence of the PRIB.

2. The apparatus of claim 1, wherein a requirement of countersigning the evidence of the PRIB is included in a CRIB attestation policy stored in the PRIB.

3. The apparatus of claim 1, wherein the PRIB includes circuitry to attest the CRIB, the CRIB is to attest the PRIB, and the PRIB is to determine whether the PRIB is trusted by the CRIB in response to the PRIB successfully attesting the CRIB and the CRIB successfully attesting the PRIB.

4. The apparatus of claim 3, wherein the CRIB is to attest the PRIB based at least in part on a primary attestation policy (PAP) stored in the CRIB.

5. The apparatus of claim 1, wherein the CRIB includes circuitry to generate the key of the CRIB based on a CRIB seed stored in the CRIB and a PRIB seed received from the PRIB.

6. The apparatus of claim 5, wherein the PRIB is to generate the PRIB seed and an interaction key (IK).

7. The apparatus of claim 6, wherein the PRIB is to receive the CRIB seed from the CRIB, is to generate an IK seed from the PRIB seed and the CRIB seed, is to generate the IK from the IK seed, and is to send the IK to the CRIB.

8. The apparatus of claim 7, wherein the CRIB is to encrypt information with the IK for secure and trusted communication between the CRIB and the computing system.

9. The apparatus of claim 7, wherein the CRIB is to sign attestation evidence with the IK during booting of the apparatus.

10. The apparatus of claim 6, wherein the CRIB is to generate the CRIB key and the PRIB is to generate the IK at a time of manufacturing, integration or testing of the apparatus.

11. A method comprising:

receiving, by circuitry of a host intellectual property (IP) block of a host IP core, which is contributed by a system integrator entity, in a multi-chip package (MCP) in a first computing system, a request by a second computing system, which is operated by a first stakeholder entity different than the system integrator entity, to establish a secure communications session with a first client RoT IP block (CRIB) of a plurality of client RoT IP blocks (CRIBs) of the MCP, each of the plurality of CRIBs contributed by a different stakeholder entity of a plurality of stakeholder entities that are each different than the system integrator entity, the first CRIB contributed by the first stakeholder entity of the plurality of stakeholder entities and a second CRIB of the plurality of CRIBs contributed by a second stakeholder entity of the plurality of stakeholder entities different than the first stakeholder entity and different than the system integrator entity;

authenticating and attesting, by a primary root of trust (RoT) IP block (PRIB) in the MCP, the second computing system, the PRIB contributed by the system integrator entity, wherein the system integrator entity is to integrate the plurality of CRIBs into the multi-chip package (MCP);

signing, by circuitry of the host IP block, evidence of the PRIB with a PRIB key;

signing the evidence of the PRIB with a key of the CRIB, wherein the evidence of the PRIB is required to be countersigned by the CRIB;

sending, by circuitry of the host IP block, the signed evidence of the PRIB signed with the PRIB key and the key of the CRIB to the second computing system; and establishing, with circuitry, the secure communications session between the second computing system and the first CRIB of the MCP if the PRIB is trusted by the second computing system based at least in part on the signed evidence of the PRIB.

12. The method of claim 11, wherein a requirement of countersigning the evidence of the PRIB is included in a CRIB attestation policy stored in the PRIB.

13. The method of claim 11, comprising the PRIB attesting the CRIB, the CRIB attesting the PRIB, and determining that the PRIB is trusted by the CRIB in response to the PRIB successfully attesting the CRIB and the CRIB successfully attesting the PRIB.

14. The method of claim 13, comprising the CRIB attesting the PRIB based at least in part on a primary attestation policy (PAP) stored in the CRIB.

15. The method of claim 11, comprising generating the CRIB key based on a CRIB seed stored in the CRIB and a PRIB seed received from the PRIB.

16. The method of claim 15, comprising the PRIB generating the PRIB seed and an interaction key (IK).

17. The method of claim 16, comprising the PRIB receiving the CRIB seed from the CRIB, generating an IK seed from the PRIB seed and the CRIB seed, generating the IK from the IK seed, and sending the IK to the CRIB.

18. The method of claim 17, comprising encrypting information with the IK for secure and trusted communication between the CRIB and the second computing system.

19. The method of claim 16, comprising generating the CRIB key and the IK at a time of manufacturing, integration or testing of the MCP.

20. At least one non-transitory machine-readable storage medium comprising instructions which, when executed by at least one processor, cause the at least one processor to perform operations, including to:

receive, by circuitry of a host intellectual property (IP) block of a host IP core, which is contributed by a system integrator entity, in a multi-chip package (MCP) in a first computing system, a request by a second computing system, which is operated by a first stakeholder entity different than the system integrator entity, to establish a secure communications session with a first client RoT IP block (CRIB) of a plurality of client RoT IP blocks (CRIBs) of the MCP, each of the plurality of CRIBs contributed by a different stakeholder entity of a plurality of stakeholder entities that are each different than the system integrator entity, the first CRIB contributed by the first stakeholder entity of the plurality of stakeholder entities and a second CRIB of the plurality of CRIBs contributed by a second stakeholder entity of the plurality of stakeholder entities different than the first stakeholder entity and different than the system integrator entity;

authenticate and attest, by a primary root of trust (RoT) IP block (PRIB) in the MCP, the second computing system, the PRIB contributed by the system integrator entity, wherein the system integrator entity is to integrate the plurality of CRIBs into the multi-chip package (MCP);

sign, by circuitry of the host IP block, evidence of the PRIB with a PRIB key;

sign the evidence of the PRIB with a key of the CRIB, wherein the evidence of the PRIB is required to be countersigned by the CRIB;

send, by circuitry of the host IP block, the signed evidence of the PRIB signed with the PRIB key and the key of the CRIB to the second computing system; and establish, with circuitry, the secure communications session between the second computing system and the first CRIB of the MCP if the PRIB is trusted by the second computing system based at least in part on the signed evidence of the PRIB.

21. The at least one non-transitory machine-readable storage medium of claim 20, wherein a requirement of countersigning the evidence of the PRIB is included in a CRIB attestation policy stored in the PRIB.

22. The at least one non-transitory machine-readable storage medium of claim 20, comprising instructions which, when executed by the at least one processor, cause the at least one processor to cause the PRIB to attest the CRIB, the CRIB to attest the PRIB, and to determine that the PRIB is trusted by the CRIB in response to the PRIB successfully attesting the CRIB and the CRIB successfully attesting the PRIB.

* * * * *